US010036435B2

(12) United States Patent
Milehins et al.

(10) Patent No.: US 10,036,435 B2
(45) Date of Patent: Jul. 31, 2018

(54) VEHICLE CLUTCH CONTROL SYSTEMS

(71) Applicant: Raicam Clutch Limited, Milton Keynes (GB)

(72) Inventors: Mihails Milehins, Leamington Spa (GB); Benjamin Chetwood Struve, Leamington Spa (GB)

(73) Assignee: RAICAM CLUTCH LIMITED, Milton Keynes (GB)

( * ) Notice: Subject to any disclaimer, the term of this patent is extended or adjusted under 35 U.S.C. 154(b) by 308 days.

(21) Appl. No.: 14/772,300

(22) PCT Filed: Mar. 4, 2014

(86) PCT No.: PCT/GB2014/000076
§ 371 (c)(1),
(2) Date: Sep. 2, 2015

(87) PCT Pub. No.: WO2014/135831
PCT Pub. Date: Sep. 12, 2014

(65) Prior Publication Data
US 2016/0010707 A1    Jan. 14, 2016

(30) Foreign Application Priority Data

Mar. 5, 2013  (GB) .................................. 1303946.6
Dec. 9, 2013  (GB) .................................. 1321660.1

(51) Int. Cl.
*F16D 48/06*    (2006.01)

(52) U.S. Cl.
CPC ...... *F16D 48/06* (2013.01); *F16D 2500/1082* (2013.01); *F16D 2500/1083* (2013.01);
(Continued)

(58) Field of Classification Search
CPC ........... F16D 48/06; F16D 2500/10412; F16D 2500/1082; F16D 2500/1083; F16D 2500/50203
See application file for complete search history.

(56) References Cited

U.S. PATENT DOCUMENTS 5,377,797 A * 1/1995 Mustapha ............. B60W 10/02
                                                         192/3.55
2005/0222736 A1  10/2005 Lee
2012/0028759 A1* 2/2012 Tsujimura ............... F16D 48/06
                                                         477/175

FOREIGN PATENT DOCUMENTS

DE    102006043079 A1    4/2007
DE    102011101168 A1   11/2012
(Continued)

OTHER PUBLICATIONS

International Search Report in related PCT Application No. PCT/GB2014/000076, dated Apr. 20, 2015.
(Continued)

*Primary Examiner* — Edwin A Young
(74) *Attorney, Agent, or Firm* — Troutman Sanders LLP; Ryan Schneider; Christopher Close

(57) ABSTRACT

A vehicle having a clutch which connects an engine with a driveline which includes a multi-ratio gearbox, the clutch having an actuator which can be operated by a vehicle driver to engage and disengage the clutch, the actuator also having a control system arranged to move the clutch between fully engaged and fully released positions through a range of positions allowing variable levels of clutch slip in order to automatically reduce torsional vibrations in the driveline. The control system is configured to recognize a plurality of predetermined Vehicle Operation Modes defined by the combination of a Clutch Slip Status criterion as hereinbefore defined with one or more of the hereinbefore defined oper- (Continued)

ating criteria of Manual Clutch Position Control Input Interface Status, Release Bearing Position Status and Slip Velocity Demand Status and, dependent on the recognized Vehicle Operation Mode, the control system applies a different clutch control strategy to achieve the required level of clutch slip to damp vibration in the driveline and provide transition between the different Vehicle Operation Modes without exciting an uncomfortable level of vibration in the driveline.

20 Claims, 34 Drawing Sheets

(52) U.S. Cl.
CPC .............. *F16D 2500/10412* (2013.01); *F16D 2500/1107* (2013.01); *F16D 2500/3026* (2013.01); *F16D 2500/3065* (2013.01); *F16D 2500/3069* (2013.01); *F16D 2500/30406* (2013.01); *F16D 2500/30407* (2013.01); *F16D 2500/30806* (2013.01); *F16D 2500/30808* (2013.01); *F16D 2500/3102* (2013.01); *F16D 2500/3111* (2013.01); *F16D 2500/31413* (2013.01); *F16D 2500/50203* (2013.01); *F16D 2500/50239* (2013.01); *F16D 2500/50293* (2013.01); *F16D 2500/50858* (2013.01); *F16D 2500/50883* (2013.01); *F16D 2500/7041* (2013.01); *F16D 2500/70426* (2013.01)

(56) References Cited

FOREIGN PATENT DOCUMENTS

| EP | 0458450 A1 | 11/1991 |
| EP | 0601728 A | 6/1994 |
| WO | 2010128276 A1 | 11/2010 |
| WO | 2013024239 A | 2/2013 |

OTHER PUBLICATIONS

Search Report in related GB Application No. GB1321660.1, dated Jun. 23, 2014.
Search Report in related GB Application No. GB1303946.6, dated Aug. 22, 2013.

\* cited by examiner

| | |
|---|---|
| 1.1. | Vehicle power on – the vehicle enters this state as soon as vehicle electronics are switched on and messages can be transmitted via vehicle CAN. It stays in this mode until electronics have been switched off and no messages can be transmitted via vehicle CAN. |
| 1.1.1. | Engine off – engine crankshaft not rotating |
| 1.1.1.1. | After running – engine crankshaft not rotating due to driver's request to switch the engine off after running (i.e. after it reached the idling speed) it for a certain period of time. |
| 1.1.1.2. | Crank fail – engine crankshaft stopped rotating immediately after engine cranking failure. |
| 1.1.1.3. | Before crank on – engine crankshaft not rotating before driver's request to crank the engine on. |
| 1.1.1.4. | Stopped by stop-start system – engine crankshaft not rotating after being switched off by the stop-start system. |
| 1.1.2. | Engine on – engine rotating at a non-zero speed due to combustion process. |
| 1.1.2.1. | Engine switching off – engine is being switched off due to driver's request or otherwise. In this condition the rotational speed of the crankshaft of the engine is greater than zero, but below the idling speed of that engine. |
| 1.1.2.2. | Engine running – normal operation, the rotational speed of the engine is greater or equal to the idling speed. |

Figure 14A

| | |
|---|---|
| 1.1.2.3. | Crank on/engine switching on – switching the engine on. |
| 1.1.2.2.1. | Idle speed control – the engine crankshaft rotational speed is controlled by a dedicated idle speed control algorithm. |
| 1.1.2.2.2. | Throttle pedal control – the engine crankshaft rotational speed and torque delivered by the engine are controlled via driver's input through throttle pedal. |
| 1.1.2.2.2.1. | Positive mean torque through the clutch – the mean torque being passed through clutch is positive (mean is measured in the sense that it ignores the cyclic torque variations of the torque due to the combustion process - can be obtained by measuring the instantaneous torque and then filtering the obtained signal with a low-pass filter with a cut-off frequency below 20 Hz). |
| 1.1.2.2.2.2. | Close-to-zero mean torque through clutch – the mean torque being passed through clutch is close to zero. This means that the mean torque falls within a certain pre-defined band, e.g. below 10 Nm and above -10 Nm. |
| 1.1.2.2.2.3. | Negative mean torque through clutch – the mean torque being passed through clutch is negative. |
| 1.2. | Vehicle power off – vehicle electronics switched off, no messages are available on vehicle CAN. |
| 2.1. | Stop-start enabled – stop-start system can switch the engine on/off. |

Figure 14B

| | |
|---|---|
| 2.1.1. | Stop-start active – stop-start system either switched the engine off or is in the process of switching the engine off or is in the process of switching the engine on after it was switched off by the stop-start system. |
| 2.1.2. | Stop-start inactive – stop-start system is not interfering with the normal operation of the engine. |
| 2.2. | Stop-start disabled – stop-start system cannot switch the engine on/off. |
| 3.1. | Clutch stuck – clutch transmits all torque applied to it. |
| 3.1.1. | Fully closed – clutch can transmit the torque equivalent to its maximum possible *Effective Clutch Torque Capacity*. |
| 3.1.2. | Not fully closed – clutch is operating below the maximum possible *Effective Clutch Torque Capacity*, but has enough torque capacity to transmit all torque passed through the friction interfaces without slipping. |
| 3.2. | Clutch slipping – clutch slipping, i.e. the torque being transmitted through the clutch friction interface is less than the torque applied to it, which results in the clutch friction plates moving at a non-zero speed relative to each other. |
| 3.2.1. | Full slip – clutch is slipping, i.e. transmitting non-zero torque through its friction interfaces. |

Figure 14C

| | |
|---|---|
| 3.2.2. | Stick-slip – clutch makes a frequent transition from stick to slip state (typically at a frequency higher than the engine cyclic excited torque variation, i.e. above approximately 15 Hz). |
| 3.3. | Zero effective clutch torque capacity – clutch cannot transmit any significant amount of torque through its friction interfaces. |
| 3.3.1. | Fully open – release bearing of the clutch is positioned at the maximum travel in the "open" direction. |
| 3.3.2. | Not fully open – release bearing of the clutch is positioned between the maximum release travel and the "kiss point" (i.e. the point where the clutch starts transmitting significant amount of torque). |
| 4.1. | Clutch opening demand – driver provides an input suggesting that he/she intends to open the clutch. |
| 4.1.1. | Below automatic control demand – driver is providing an input suggesting that he/she intends to open the clutch, but the output of the Manual Control Function is below the currently demanded release bearing position. |
| 4.1.2. | Over automatic control demand – driver is providing an input suggesting that he/she intends to open the clutch and the output of the *Manual Control Function* is above or equivalent to the currently demanded release bearing position. |
| 4.1.2.1. | Clutch fully open demand – driver is providing an input suggesting that he/she demands the clutch to be fully open. |

Figure 14D

| | |
|---|---|
| 4.1.2.2. | Clutch pre-fully open demand – conditions for over automatic control demand state are satisfied and driver does not demand the clutch to be fully open. |
| 4.2. | Clutch open demand – driver provides an input suggesting that he/she intends to close the clutch. |
| 4.2.1. | Engine not running clutch closing demand – driver is providing an input suggesting that he/she intends to close the clutch while the engine is not running. |
| 4.2.2. | Engine running clutch closing – driver is providing an input suggesting that he/she intends to close the clutch while the engine is running. |
| 4.2.2.1. | *Biting Point* search – driver is closing the clutch through *Manual Control Function* and the release bearing position did not reach the *Biting Point* yet. |
| 4.2.2.2. | Manual *Slip Velocity* control – driver is closing the clutch through Manual Control Function and the release bearing position is located at the position between the *Biting Point* and the point where the clutch is stuck. |
| 4.2.2.2.1. | Clutch velocities not aligned - the driver is in the process of closing the clutch, the clutch is slipping and the condition for velocity matching on both sides of the clutch friction interface are not satisfied (the decision whether the velocities are aligned or not is made by the *Manual Clutch Position Control Input Interface Status Observer*). |

Figure 14E

| | |
|---|---|
| 4.2.2.2.2. | Clutch velocities aligned – the driver is in the process of closing the clutch, the velocities on both sides of the clutch friction interface are aligned (the decision whether the velocities are aligned or not is made by the *Manual Clutch Position Control Input Interface Status Observer*). |
| 4.2.2.3. | Stuck point found – driver is in the process of closing the clutch. The stuck point was reached and the *Effective Clutch Torque Capacity* is sufficient to transmit all torque supplied to the clutch. |
| 4.2.2.3.1. | Clutch fully closed demand – the driver is in the process of closing the clutch, the "stuck" point was reached and the driver is demanding (through *Manual Control Function* output) the clutch to be fully closed. |
| 4.2.2.3.2. | Clutch not fully closed demand – the driver is in the process of closing the clutch, the "stuck" point was reach, but the driver is not demanding the clutch to be fully closed. |
| 5.1. | Vehicle moving – vehicle has a non-zero longitudinal speed or the wheels of the vehicle are rotating. |
| 5.2. | Vehicle stationary – vehicle has a zero longitudinal speed or the wheels of the vehicle are not rotating. |
| 6.1. | Neutral – neutral has been selected by the driver. |
| 6.2. | In gear – a non-neutral gear has been selected by the driver. |

Figure 14F

| | |
|---|---|
| 6.2.1. | Gear not detected – drive has selected a non-neutral gear, but the *Gear Detection Status Observer* has not yet reached a decision as to which gear was selected. |
| 6.2.2. | Reverse – reverse gear engaged. |
| 6.2.2+N. | (N – positive integer) Gear N – gear N engaged. |
| 7.1 | Likely zero *Effective Clutch Torque Capacity* - the *Effective Clutch Torque Capacity* of the clutch is likely to be zero. This condition is considered to be satisfied if the demanded / estimated release bearing position is above (with a certain "safety" threshold) the position corresponding to the *Biting Point* of the clutch. |
| 7.1.1. | Fully open position – the demanded / estimated release bearing position is suggesting that the clutch is fully open. |
| 7.1.2. | Not full open position – the conditions for the state 7.1. to be active hold true, but the demanded / estimated release bearing position does not suggest that the clutch has to be fully open. |
| 7.2. | Unlikely slip – the *Effective Clutch Torque Capacity* of the clutch is such that it is likely that all of the torque supplied to the clutch is being transmitted through it and the clutch is not slipping. This condition is considered to be satisfied if the demanded / estimated release bearing position is below the *Under-Predicted Position*. |

Figure 14G

| | |
|---|---|
| 7.2.1 | Fully closed position – the demanded / estimated release bearing position is suggesting that the clutch is fully closed. |
| 7.2.2. | Not fully closed position – the conditions for the state 7.2. to be active hold true, but the conditions for the clutch to be considered to be fully closed are not satisfied. |
| 7.3. | Safety band zero *Effective Clutch Torque Capacity* – the demanded / estimated release bearing position is just above the *Biting Point* position. |
| 7.4. | Likely slip – the demanded / estimated release bearing position is above the *Predicted Position* but below the *Biting Point* position. |
| 7.5. | Safety band slip – the demanded / estimated release bearing position is suggesting that the clutch may be slipping or is close to the position where it can start slipping. The band where this condition holds true can be defined to be between the *Under-Predicted Position* and the *Predicted Position*. |
| 8.1. | Non-zero *Slip Velocity* demand – *Slip Velocity Demand Generation Subsystem* is demanding non-zero *Slip Velocity*. |
| 8.1.1. | Negative *Slip Velocity* demand – *Slip Velocity Demand Generation Subsystem* is demanding negative *Slip Velocity*. |
| 8.1.2. | Positive *Slip Velocity* demand – *Slip Velocity Demand Generation Subsystem* is demanding positive *Slip Velocity*. |

Figure 14H

| | |
|---|---|
| 8.2. | Zero *Slip Velocity* demand – *Slip Velocity Demand Generation Subsystem* is demanding zero *Slip Velocity*. |
| 9.1. | Position of the manual clutch position control input interface directly affects the position of the release bearing of the clutch. |
| 9.2. | Position of the manual clutch position control input interface has no effect on the position of the release bearing of the clutch. |
| 10.1. | Wear compensation ready to execute – the pre-defined time since the clutch was last fully closed has elapsed. |
| 10.2. | Wear compensation time out – the pre-defined time since the clutch was last fully closed has not elapsed yet. |

Figure 14I

| Vehicle Operation Mode | Criteria |  |  |  |  |  |  |  |  |  |
|---|---|---|---|---|---|---|---|---|---|---|
|  | Power Status of the Vehicle | Stop-Start System Status | Clutch Slip Status | Manual Clutch Position Control Input Interface Status | Vehicle Speed Status | Gear Detection Status | Release Bearing Position Status | Slip Velocity Demand Status | Automatic / Manual Control Status | Wear Adjuster Status |
| 1 | 1.1.2.2.2. | 2.1.2. | 3.2.2. | 4.1. | Any | 6.2.4. | 7.5. | 8.1. | 9.2. | Any |
| 2 | 1.1.1.4. | 2.1.1. | 3.3. | 4.1. | 5.2. | Any | 7.1.1. | Any | 9.2. | Any |

Figure 15

| | |
|---|---|
| $\xrightarrow{\gamma.i}$ | Transition with condition |
| $\gamma.i$ | Transition condition |
| [State name] | State |
| ● | Junction pseudostate or initial pseudostate |
| == | Boolean equivalence operator |
| ≥ | Boolean equal or greater operator |
| > | Boolean greater operator |
| ≤ | Boolean less or equal operator |
| < | Boolean less operator |
| ∧ | Boolean AND operator |
| ∨ | Boolean OR operator |
| ¬ | Boolean NOT operator |
| ≠ | Boolean not equal operator |

Figure 17

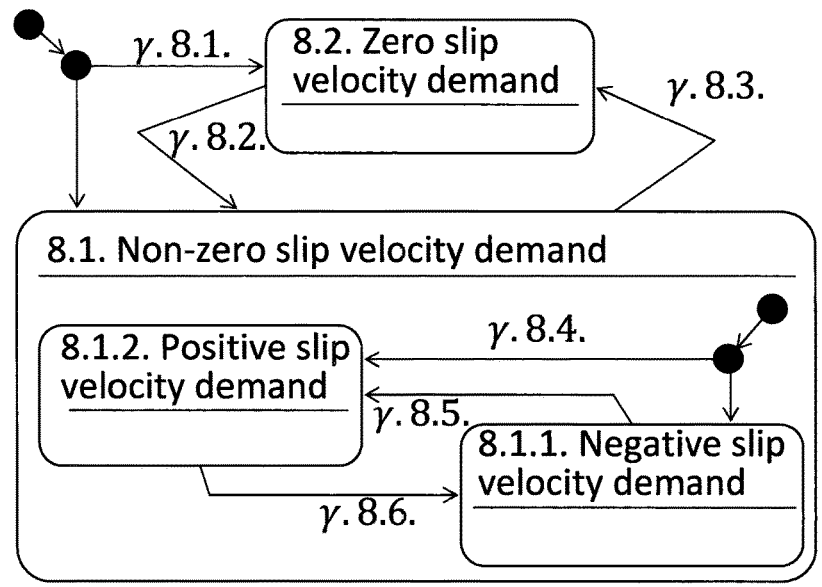

Figure 19

| | |
|---|---|
| *DemandedClutchSlipVelocity* | Demanded clutch slip velocity |
| *ClutchSlipVelocity* | Measured clutch slip velocity |
| *StickSlipDetected* | Detected stick-slip |
| *NRBPosition* | Release bearing position normalised between the minimum and maximum possible positions |
| *NRBBitingPointPosition* | Normalised release bearing position corresponding to the biting point of the clutch |

Figure 20

| | |
|---|---|
| *NoSlipSpeedThreshold* | Positive parameter defining the absolute value of the slip velocity at which the clutch can be assumed not to be slipping (non-zero value can be used to cope with the slip velocity measurement noise and imperfect observation) |
| *SlipSpeedThreshold* | Positive parameter defining the absolute valued of the slip velocity at which the clutch can be assumed to be slipping (non-zero value can be used to cope with the slip velocity measurement noise and imperfect observation) |

Figure 21A

| | |
|---|---|
| $NRBClutchFullyOpenPosition$ | Positive parameter defining the value of the normalised release bearing position above which the clutch can be considered to be fully open |
| $NRBClutchFullyClosedPosition$ | Positive parameter defining the value of the normalised release bearing position below which the clutch can be considered to be fully closed |
| $MinDemandedClutchSlipSpeed$ | Positive parameter defining the absolute value of the demanded slip velocity at which it can be assumed that the slip is not demanded (a positive value could be needed to avoid problems with numerical precision) |

Figure 21B

| Condition | Condition Description |
|---|---|
| $\gamma.3.1.$ | $NRBPosition > NRBBitingPointPosition$ |
| $\gamma.3.2.$ | $\|ClutchSlipVelocity\| > SlipSpeedThreshold$ |
| $\gamma.3.3.$ | $NRBPosition < NRBBitingPointPosition$ |
| $\gamma.3.4.$ | $NRBPosition > NRBBitingPointPosition$ |
| $\gamma.3.5.$ | $\|ClutchSlipVelocity\| < NoSlipSpeedThreshold$ |
| $\gamma.3.6.$ | $\|ClutchSlipVelocity\| > SlipSpeedThreshold$ |
| $\gamma.3.7.$ | $NRBPosition < NRBClutchFullyOpenPosition$ |
| $\gamma.3.8.$ | $NRBPosition > NRBClutchFullyOpenPosition$ |
| $\gamma.3.9.$ | $NRBPosition < NRBClutchFullyOpenPosition$ |
| $\gamma.3.10.$ | $StickSlipDetected == TRUE$ |
| $\gamma.3.11.$ | $StickSlipDetected == TRUE$ |
| $\gamma.3.12.$ | $StickSlipDetected == FALSE$ |
| $\gamma.3.13.$ | $NRBPosition < NRBClutchFullyClosedPosition$ |
| $\gamma.3.14.$ | $NRBPosition < NRBClutchFullyClosedPosition$ |
| $\gamma.3.15.$ | $NRBPosition > NRBClutchFullyClosedPosition$ |

Figure 22A

| | |
|---|---|
| $\gamma.8.1.$ | $\|DemandedClutchSlipVelocity\|$ $< MinDemandedClutchSlipSpeed$ |
| $\gamma.8.2.$ | $\|DemandedClutchSlipVelocity\|$ $> MinDemandedClutchSlipSpeed$ |
| $\gamma.8.3.$ | $\|DemandedClutchSlipVelocity\|$ $< MinDemandedClutchSlipSpeed$ |
| $\gamma.8.4.$ | $DemandedClutchSlipVelocity > 0$ |
| $\gamma.8.5.$ | $DemandedClutchSlipVelocity > 0$ |
| $\gamma.8.6.$ | $DemandedClutchSlipVelocity < 0$ |

Figure 22B

| Control function name | Control function label |
|---|---|
| *Manual Control Function* | CF1 |
| *Closed Loop Slip Velocity Control Function* | CF2 |
| *Constant Gradient Effective Clutch Torque Capacity Torque Ramp with respect to a Feedforward Reference Signal* | CF3 |
| *Constant Gradient Release Bearing Position Ramp with respect to a Feedforward Reference Signal* | CF4 |
| *Release Bearing Position Tracking Function* | CF5 |

Figure 23

| Vehicle Operation Mode | Control function | Description |
|---|---|---|
| 1: 1.1.1.3.<br>6: 6.1. | CF4 | Open the clutch if in neutral and before cranking on the engine using a constant gradient ramp. The ramp function must be parameterised to ensure that the clutch opens very quickly (100-200ms). |
| 1: 1.1.1.3.<br>6: 6.2. | CF1 | Manual clutch control if in gear before cranking on the engine. |
| 1: 1.1.2.2.<br>6: 6.1. | CF4 | Open the clutch if in neutral when the engine is running. The ramp function must be parameterised to ensure that the clutch opens very quickly (100-200ms). |
| 1: 1.1.2.2.<br>4: 4.2.2.1.<br>6: 6.2. | CF1 | Clutch under manual control while the driver is trying to find the *Biting Point*. |
| 1: 1.1.2.2.<br>4: 4.2.2.2.1.<br>6: 6.2. | CF1 | Clutch under manual control while driver is trying to align the velocities of the components on the right and left hand sides of the clutch. |

Figure 29A

| | | |
|---|---|---|
| 1: 1.1.2.2.<br>3: 3.2.<br>4: 4.2.2.2.2.<br>6: 6.2. | CF2 | Pass the control to the closed loop *Slip Velocity* control to finish aligning the velocities of the components on the right and left hand sides of the clutch by demanding a *Slip Velocity* profile. |
| 1: 1.1.2.2.<br>3: 3.2.<br>4: 4.2.2.3.<br>6: 6.2.<br>8: 8.1. | CF2 | Closed loop *Slip Velocity* control is activated when the driver demands the clutch to be closed, non-zero *Slip Velocity* is demanded and the clutch is slipping. |
| 1: 1.1.2.2.<br>3: 3.2.<br>4: 4.2.2.3.<br>6: 6.2.<br>7: 7.4. or 7.5. or 7.3.<br>8: 8.2. | CF3 | If slip is detected and zero *Slip Velocity* is demanded, the actuator moves the clutch release bearing to the position where the clutch stops slipping at a variable rate that ensures that the *Effective Clutch Torque Capacity* increases at a constant rate with respect to the *Effective Clutch Torque Capacity* at which the clutch stops slipping and reaches the *Under-Predicted Position*. |
| 1: 1.1.2.2.<br>3: 3.2.<br>4: 4.2.2.3.<br>6: 6.2.<br>7: 7.2.<br>8: 8.2.<br>10: 10.2 | CF5 | If no slip is detected, zero *Slip Velocity* is demanded and wear compensation is not required, the actuator tracks the *Under-Predicted Position*. |

Figure 29B

| | | |
|---|---|---|
| 1: 1.1.2.2.<br>3: 3.2.<br>4: 4.2.2.3.<br>6: 6.2.<br>7: 7.2.<br>8: 8.2.<br>10: 10.1 | CF4 | If no slip is detected, zero *Slip Velocity* is demanded and wear compensation is required, the actuator closes at a constant rate until closed position is reached and stays there until the wear compensation switches to time out or non-zero *Slip Velocity* is demanded or driver attempts to open the clutch. |
| 1: 1.1.2.2.<br>3: 3.1.<br>4: 4.2.2.3.<br>6: 6.2.<br>7: 7.2.<br>8: 8.1. | CF4 | If no slip is detected, non-zero *Slip Velocity* is demanded and the release bearing position suggests that the slip is unlikely, the actuator is moved quickly at a constant rate towards the clutch open position until the release bearing position reaches the *Under-Predicted Position* (i.e. the active state of the *Release Bearing Position Status* becomes the *Safety Slip Band*) |

Figure 29C

| | | |
|---|---|---|
| 1: 1.1.2.2.<br>3: 3.1.<br>4: 4.2.2.3.<br>6: 6.2.<br>7: 7.4. or 7.5 or 7.3.<br>8: 8.1. | CF3 | If no slip is detected, non-zero *Slip Velocity* is demanded and release bearing position is over the *Under-Predicted Position*, the actuator moves the clutch release bearing to the position where the clutch starts slipping at a variable rate that ensures that the *Effective Clutch Torque Capacity* increases at a constant rate with respect to the *Effective Clutch Torque Capacity* at which the clutch starts slipping until clutch slip is detected. |
| 1: 1.1.2.2.<br>4: 4.1.2.<br>6: 6.2. | CF1 | If driver's clutch release bearing position demand exceeds the automatic control system demand, allow the driver to take control of the clutch position |

Figure 29D

| Man. Point | Active *Vehicle Operation Mode* |
|---|---|
| 1 | (1.1.1.3., 6.2.3.) |
| 2 | (1.1.2.2., 4.2.1., 6.2.3.) |
| 3 | (1.1.2.2., 4.2.2., 6.2.3.) |
| 4 | (1.1.2.2., 3.2., 4.2.2.3., 6.2.3. 7.2., 8.2., 10.1) |
| 5 | (1.1.2.2., 3.2., 4.2.2.3., 6.2.3. 7.2., 8.2., 10.2) |
| 6 | (1.1.2.2., 3.1., 4.2.2.3., 6.2.3., 7.3., 8.1.) |
| 7 | (1.1.2.2., 3.2., 4.2.2.3., 6.2.3., 8.1.) |
| 8 | (1.1.2.2., 3.2., 4.2.2.3., 6.2.3., 7.3., 8.2.) |
| 9 | (1.1.2.2., 3.2., 4.2.2.3., 6.2.3. 7.2., 8.2., 10.2) |
| 10 | (1.1.2.2., 3.2., 4.2.2.3., 6.2.3. 7.2., 8.2., 10.1) |
| 11 | (1.1.2.2., 3.2., 4.2.2.3., 6.2.3. 7.2., 8.2., 10.2) |
| 12 | (1.1.2.2., 3.1., 4.2.2.3., 6.2.3., 7.3., 8.1.) |
| 13 | (1.1.2.2., 3.2., 4.2.2.3., 6.2.3., 8.1.) |
| 14 | (1.1.2.2., 3.2., 4.2.2.3., 6.2.3., 7.3., 8.2.) |
| 15 | (1.1.2.2., 3.2., 4.2.2.3., 6.2.3. 7.2., 8.2., 10.1) |
| 16 | (1.1.2.2., 3.2., 4.2.2.3., 6.2.3. 7.2., 8.2., 10.2) | ns
VEHICLE CLUTCH CONTROL SYSTEMS

CROSS-REFERENCE TO RELATED APPLICATIONS

This application is a U.S. National Stage of International Application No. PCT/GB2014/000076, filed 4 Mar. 2014, which claims the benefit of GB1303946.6, filed 5 Mar. 2013, and claims the benefit of GB1321660.1, filed 9 Dec. 2013, both herein fully incorporated by reference.

This invention relates to vehicle clutch control systems and in particular to such systems used to control a vehicle drive clutch which transmits drive from a vehicle engine through an associated vehicle driveline.

There have been previous attempts to provide vehicle clutch control systems which give smooth clutch engagement without excessive wear and which also slip the clutch to damp torsional vibrations in the vehicle drive line but these previous systems are often unsophisticated in their operation and do not provide long clutch life and a comfortable driving experience for the vehicle operator.

It is an object of the present invention to provide a vehicle with an improved form of vehicle clutch control system which is more acceptable to the vehicle operator and improves clutch and driveline life.

Thus, according to the present invention there is provided a vehicle having a clutch which connects an engine with a driveline which includes a multi-ratio gearbox, the clutch having an actuator which can be operated by a vehicle driver to engage and disengage the clutch, the actuator also having a control system arranged to move the clutch between fully engaged and fully released positions through a range of positions allowing variable levels of clutch slip in order to automatically reduce torsional vibrations in the driveline, the vehicle being characterised in that the control system is configured to recognise a plurality of predetermined Vehicle Operation Modes defined by the combination of a Clutch Slip Status criterion as hereinafter defined with one or more of the hereinafter defined operating criteria of Manual Clutch Position Control Input Interface Status, Release Bearing Position Status and Slip Velocity Demand Status and, dependent on the recognised Vehicle Operation Mode, the control system applies a different clutch control strategy to achieve the required level of clutch slip to damp vibration in the driveline and provide transition between the different Vehicle Operation Modes without exciting an uncomfortable level of vibration in the driveline.

The control logic recognises and detects these various Vehicle Operation Modes and chooses an appropriate control function to control the clutch according to the detected Vehicle Operation Mode.

The above specified criteria which define the Vehicle Operation Modes are as follows:

Clutch Slip Status—indicates the current state of engagement of the clutch, for example, whether the clutch is slipping, stick-slipping (rapid change between stick and slip condition, occurring at a frequency higher than the cyclic torque variation associated with the engine combustion process), stuck, closed or open.

Manual Clutch Position Control Input Interface Status— indicates whether the vehicle driver is currently demanding the clutch to be open, closed or the driver is in the process of closing or opening the clutch, as well as the stage of this process. This is typically done by monitoring the position of the clutch pedal (or other driver operated clutch control input interface).

Release Bearing Position Status (or other clutch actuation mechanism)—indicates the current position of the release bearing relative to some pre-defined position, e.g. position where the clutch is predicted to start slipping, position where the clutch is predicted not to transmit any torque, position where the clutch is predicted to be stuck, fully open or position where the clutch is fully closed.

Slip Velocity Demand Status—this criterion is specific to the operation of the control logic of the clutch control system. Particularly, as described below, the clutch control logic has a subsystem responsible for the Slip Velocity demand generation (Slip Velocity Demand Generation Subsystem). Different operation states can be defined based on whether the non-zero Slip Velocity is demanded or no slip (i.e. zero Slip Velocity) is demanded by this subsystem.

The control system may be configured to recognise a Vehicle Operation Mode defined by a combination of the criteria of Clutch Slip Status, Slip Velocity Demand Status and Release Bearing Position Status.

For example, the control system may recognise the Vehicle Operation Mode by determining if:

a) the clutch is slipping or stick-slipping, but zero Slip Velocity is required;
b) the clutch is slipping or stick-slipping and non-zero Slip Velocity is required;
c) the clutch release bearing position is between the fully engaged and fully released positions at a position sufficient to transmit all engine torque without clutch slip and non-zero Slip Velocity is required, and
d) the clutch release bearing position is between the fully engaged and fully released positions at a position sufficient to transmit all engine torque without clutch slip and zero Slip Velocity is required.

The control system may operate by recognising additional Vehicle Operation Modes which are defined by the inclusion of one or more of the hereinbefore defined operating criteria of Power Status of the Vehicle, Stop-Start System Status, Vehicle Velocity Status, Gear Detection Status, Manual/Automatic Control Status and Wear Adjuster Status.

The above specified additional criteria are as follows:

Power Status of the Vehicle—indicates the current operating state of the engine such as whether the electrical power is on, whether the engine is running, whether the engine is idling or controlled by the throttle pedal, and the current torque delivery of the engine. These conditions can, for example, be communicated to the control system from observers or sensors via a data network such as a Controller Area Network (CAN) provided on the vehicle.

Stop-Start System Status—indicates whether a stop-start function provided on the vehicle is enabled and active. Again this status is available via the CAN.

Vehicle Velocity Status—indicates whether the vehicle is stationary or moving.

Gear Detection Status—indicates which gear is currently selected in the associated gearbox, including neutral and reverse. Also, indicates if the selected gear has not been detected.

Manual/Automatic Control Status—this criterion is based on whether the clutch release bearing position is controlled manually via the driver's clutch pedal or automatically by the control system ignoring the clutch pedal position.

Wear Adjuster Status—if an automatic clutch wear adjuster is present in the mechanical clutch actuation system, the control system can employ a timed wear adjuster compensation control strategy that periodically fully closes the clutch when appropriate. In this case the wear adjuster status would indicate if it is time to close the clutch or not.

Clutch Slip Status is determined by an observer which determines whether the clutch is open, fully closed, not slipping, stick-slipping or slipping.

The Clutch Slip Status Observer preferably includes hysteresis between maximum and minimum slip thresholds to stabilise the observation with respect to the noise, delay and measurement uncertainties of Slip Velocity signal.

Various Vehicle Operation Modes are defined by different combination of the above criteria.

Thus, for example, a first mode of operation of the vehicle could correspond to the engine crankshaft rotating under control of the throttle pedal, the stop-start system inactive, the clutch being in the stick-slip mode, the driver demanding the clutch to be closed, the vehicle being either moving or stationary, the second gear being engaged, the release bearing being positioned over the Under-Predicted Position (as hereinafter defined) and under the Predicted Position (as hereinafter defined), non-zero slip being demanded by the Slip Velocity Demand Generation Subsystem (as hereinafter described) and the clutch release bearing position being under automatic control.

A second mode of operation of the vehicle could correspond to the engine being switched off by the stop-start system, the stop-start being active (i.e. interfering with the engine control), the clutch not transmitting any torque, the driver demanding the clutch to be fully closed, the vehicle being stationary, any gear being engaged, the clutch being fully open, any Slip Velocity being demanded by the Slip Velocity Demand Generation Subsystem and clutch release bearing position being under automatic control.

Numerous other Vehicle Operation Modes can be defined by different combinations of the above criteria and these modes do not need to include all the above criteria. A mode can be defined by a combination of the current status of two or more of the above defined criteria.

Further details of the various states within each criterion are given below in the specific description of an example of a vehicle provided with the control system of the present invention.

As indicated above, the system can be operated in a manual mode in which the position of a clutch engagement pedal dictates the commanded clutch release bearing position and an automatic mode in which the commanded clutch release bearing position is determined by the torsional vibrations in the associated drive line or other operating parameters and states of the associated vehicle.

When the system is operating in the automatic mode, the control logic of the system can be logically divided into two subsystems: Slip Velocity Demand Generation Subsystem and another subsystem which attempts to achieve the Demanded Slip Velocity by controlling the actuator (Release Bearing Position Control Subsystem).

The Demanded Slip Velocity value may be calculated based on a pre-defined algorithm, for example, a multi-dimensional map whose inputs may be throttle position, or engine torque, or driveline component velocity.

In the automatic mode, if non-zero clutch Slip Velocity is required and no slip is detected, the actuator will open the clutch until slip is detected. If non-zero clutch Slip Velocity is required and slip is detected, the position of the clutch release bearing is controlled using a closed loop control algorithm (possibly in conjunction with an appropriate open loop/feedforward techniques). This algorithm aims to minimise the error between the Demanded Slip Velocity and the actual measured Slip Velocity. If zero clutch Slip Velocity is required and slip is detected, the actuator will close the clutch until no slip is detected. When zero Slip Velocity is required and no slip is detected by the system, the clutch release bearing position is set between the fully engaged and fully released positions at a position sufficient to transmit the current engine torque without clutch slip. When zero Slip Velocity is required the actuator moves the clutch release bearing to the fully closed position of the clutch periodically to allow resetting of an automatic wear adjuster in the clutch or the actuator.

The actuator may be arranged to move the clutch release bearing to the position where the clutch starts slipping at a velocity dependent on the current position of the clutch release bearing and the current distance of the clutch release bearing from the position where the clutch starts slipping. When the clutch position is far from the position where the clutch starts slipping the actuator may move the clutch the clutch release bearing at a fast speed and as the current release bearing position approaches the position where the clutch starts slipping the speed of movement of the release bearing is reduced.

When operating in the automatic mode, the clutch position at which the clutch starts slipping is calculated based on an algorithm, one of the inputs to which is the level of torque passing through one of the driveline elements.

Alternatively, when the system is operating in the automatic mode and zero Slip Velocity is required and slip is detected the actuator may move the clutch release bearing in order to fully engage the clutch.

Whenever the system detects that the driver has engaged neutral, the clutch is held open whatever the position of the clutch engagement pedal.

The system may calculate the gear selected after selection but before clutch engagement and vary the clutch engagement process accordingly.

Also, during a gear change using the clutch engagement pedal the system may control the clutch engagement sequence to replicate the sequence normally used by the operator or provide an alternative to it. Start-up of the associated vehicle's engine may be inhibited until the clutch is disengaged sufficiently to prevent the transmission of a significant amount of engine torque. For example, start-up may be inhibited until driver demands the clutch release bearing to be moved to the position corresponding to the clutch being fully closed or neutral gear mode is selected. The system can be arranged to not be switched off until it is confirmed that the engine or drive line is not rotating and the driver is not trying to actuate the clutch.

The present invention also provides a vehicle clutch control system for controlling the level of engagement of a clutch which connects an associated vehicle engine with a vehicle driveline which includes a multi-ratio gearbox controlled by an operator moved gear selector, the system including an actuator which moves the clutch release bearing (or other means of engaging and disengaging the clutch) between a position where the clutch is fully engaged and a position where the clutch is fully released through a range of positions allowing variable levels of clutch slip in order to reduce torsional vibrations in the associated driveline, the system being characterised in that the system calculates the gear selected by the operator's movement of the selector after selection but before clutch engagement and varies the clutch engagement process accordingly.

The present invention will now be described, by way of example only with reference to the accompanying drawings in which:

FIGS. 14A to 14I show in tabular form more details of the states within each of the criteria of FIGS. 4 to 13;

FIG. 15 shows in tabular form the operatiig states of the criteria which define two Vehicle Operation Modes;

FIG. 17 shows the notation used in the state machines of the status observers shown in FIGS. 18 and 19;

FIG. 19 shows the state machine for the Slip Velocity Demand Status Observer;

FIG. 20 shows in tabular form a list of the inputs to the state machines shown in FIGS. 18 and 19;

FIG. 21A and FIG. 21B show a list in tabular form of the parameters of the state machine examples shown in FIGS. 18 and 19;

FIG. 22A and FIG. 22B show a list of conditions for transition for the state machines of FIGS. 18 and 19;

Figure 24:
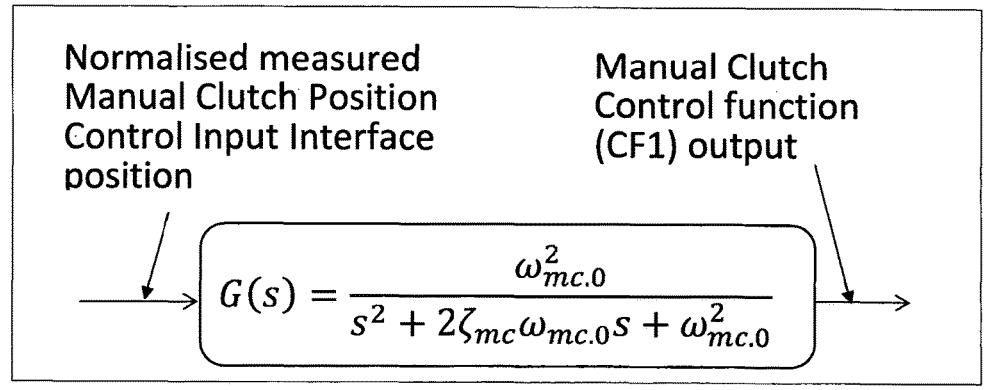
Figure 25:
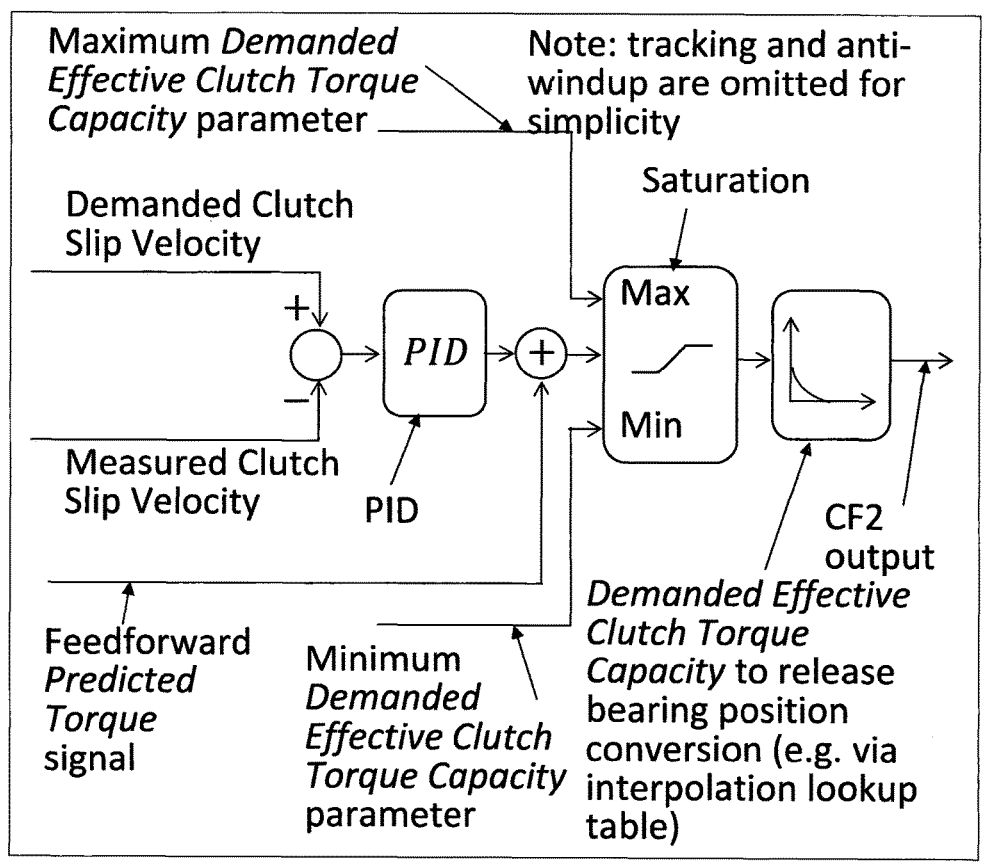
Figure 26:
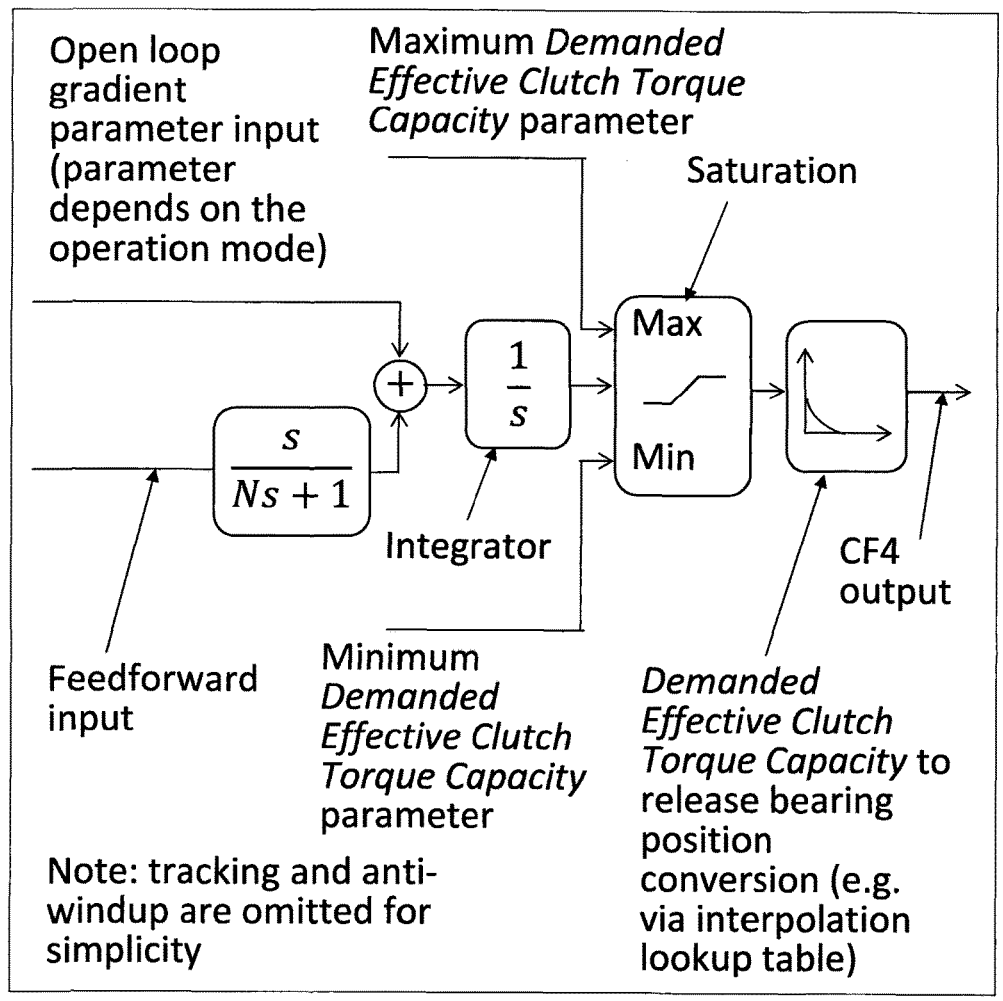
Figure 27:
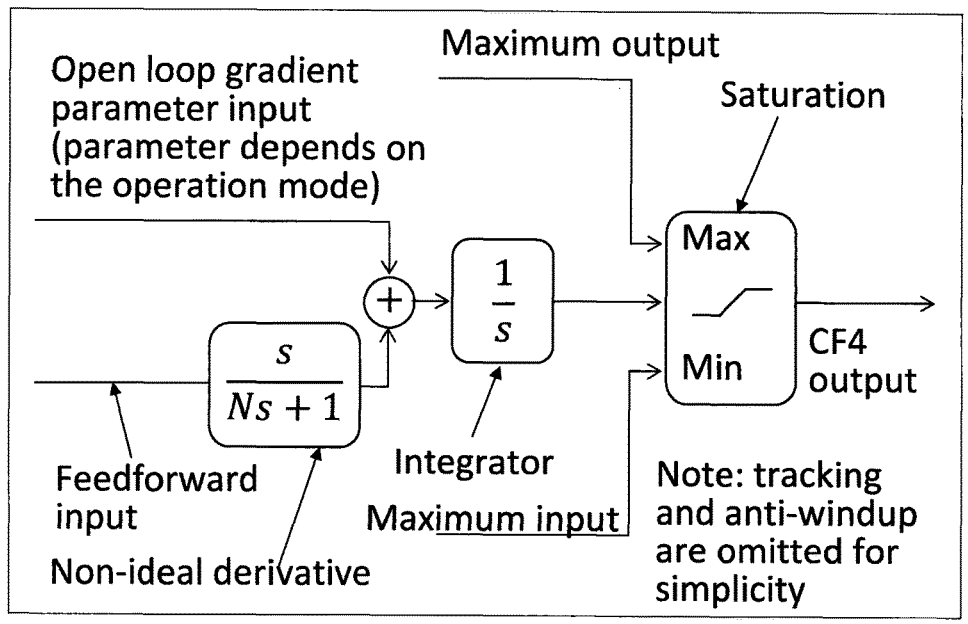
Figure 28:
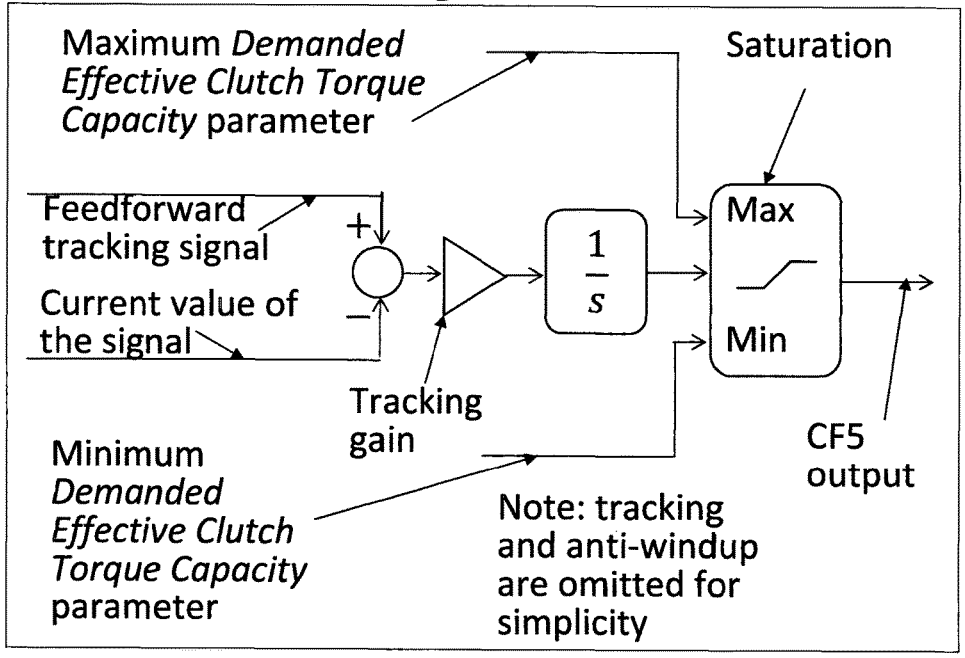
Figure 30:
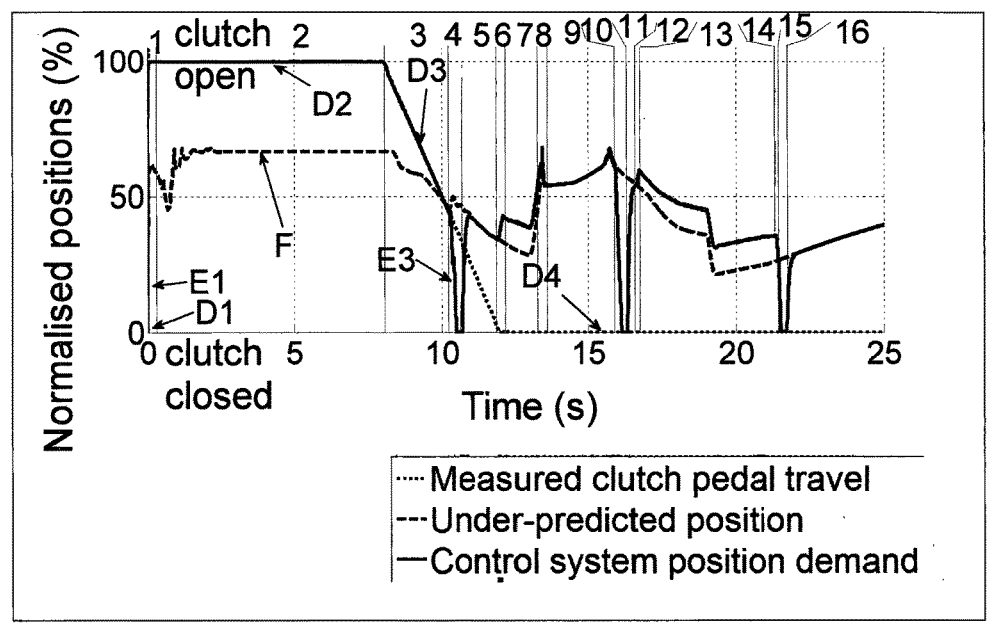
Figure 31:
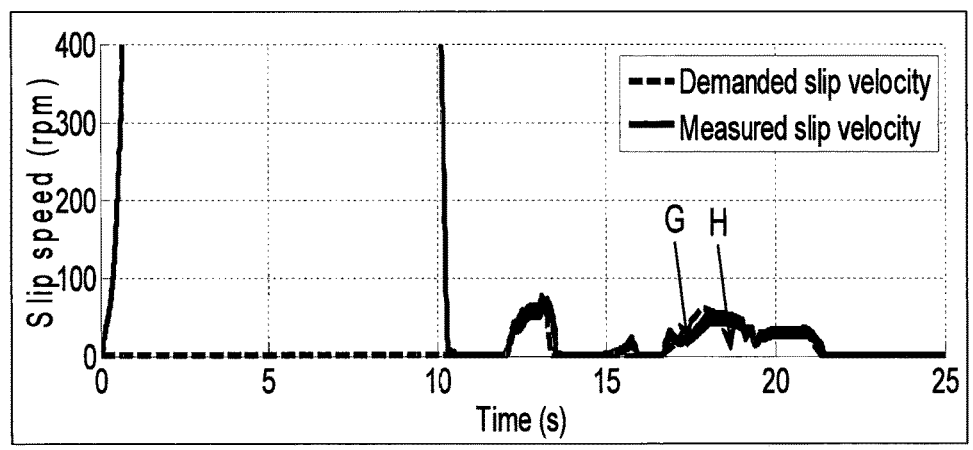
Figures 32, 33:
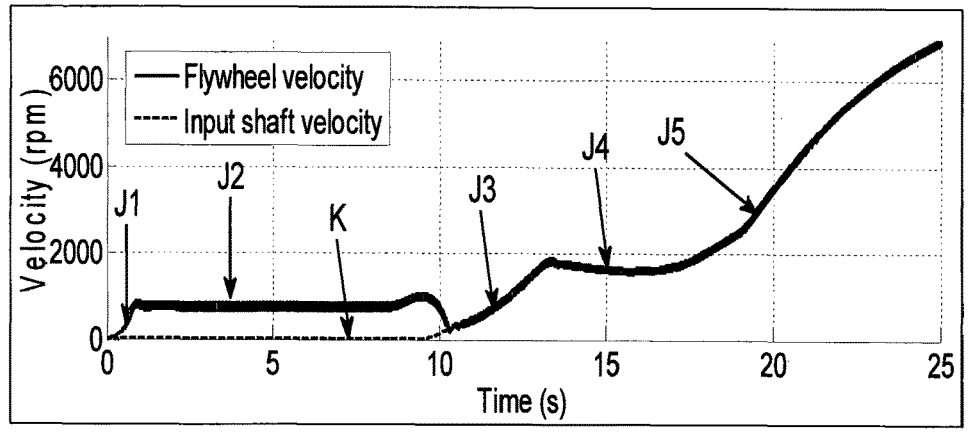

FIG. 23 lists the control functions that are used in the description of the clutch control logic;

FIG. 24 shows the block system diagram of the control logic that can be used for Manual Control Function;

FIG. 25 shows the block system diagram of the control logic that can be used for Closed Loop Slip Velocity Control Function;

FIG. 26 shows the block system diagram of the control logic that can be used for Constant Gradient Effective Clutch Torque Capacity Torque Ramp with respect to a Feedforward Reference Signal;

FIG. 27 shows the block system diagram of the control logic that can be used for Constant Gradient Release Bearing Position Ramp with respect to a Feedforward Reference Signal;

FIG. 28 shows the block system diagram of the control logic that can be used for Release Bearing Position Tracking Function;

FIGS. 29A to 29D show the lookup table that can be used to define the Clutch Control Function Selector block;

FIG. 30 shows how the Under-Predicted Position, driver clutch pedal position and the release bearing position demanded by the control logic change in time during a typical driving manoeuvre according to a particular implementation of the proposed clutch control logic;

FIG. 31 shows how the Slip Velocity demand and observed Slip Velocity change in time during the manoeuvre and clutch logic implementation of FIG. 30;

FIG. 32 shows how the flywheel and the input shaft velocities change in time during the manoeuvre and clutch logic implementation of FIG. 30, and FIG. 33 shows how the Vehicle Operation Modes change during the driving manoeuvre presented in FIGS. 30-32.

Figure 1:
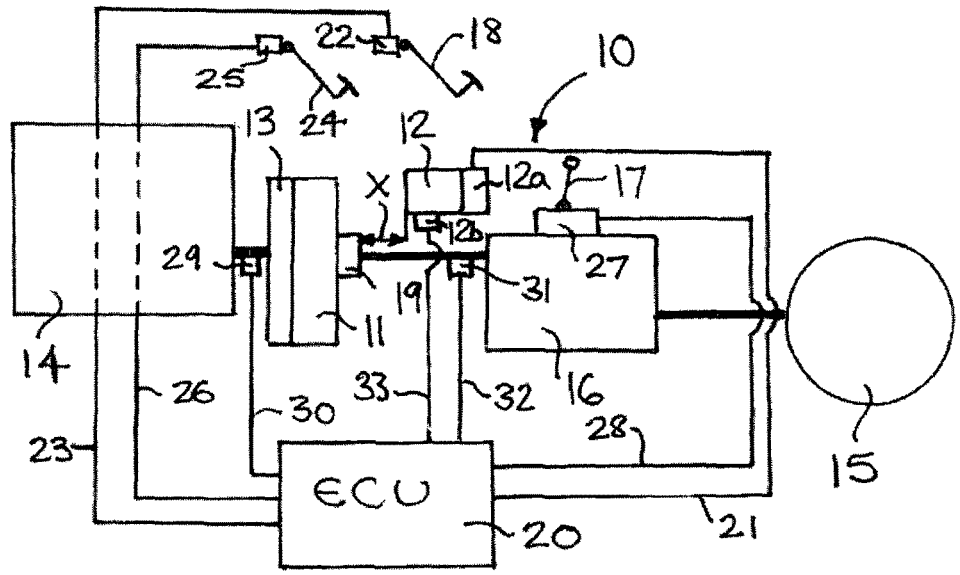
FIG. 1 shows in diagrammatic form the layout of a vehicle provided with a clutch control system in accordance with the present invention.

Referring to the drawings, FIG. 1 diagrammatically shows a vehicle provided with a clutch control system 10 for a drive clutch 11 which has an actuator 12 which changes the release bearing position of clutch 11 between a fully engaged position in which the clutch can transmit the maximum torque capacity of the clutch and a fully disengaged position in which the clutch cannot transmit any significant amount of torque. Clutch 11 transmits drive from a flywheel 13 of an engine 14 of the associated vehicle to wheels 15 via a drive line which includes a multi-ratio gearbox 16.

The operative ratio in gearbox 16 is manually selected by the vehicle operator using a conventional gear selector 17 and the clutch can be disengaged and engaged by a clutch operating pedal 18.

Clutch actuator 12 includes an electric motor 12a whose rotary motion is turned into axial movement X of a clutch release bearing 19 to disengage and engage the clutch.

The motor 12a is operated by an electronic control unit (ECU) 20 which sends motor operating signals to motor 12a via line 21.

ECU 20 also receives signals as to the position of clutch operating pedal 18 from sensor 22 via line 23, the position of engine throttle pedal 24 from sensor 25 via line 26, and the gear selected in gearbox 16 from sensor 27 via line 28.

In an alternative arrangement the gear engaged can be determined by comparing the velocities of rotation of components at different locations in the drive line after the clutch 11 (e.g. before and after the input shaft to gearbox 16).

ECU also receives an input clutch velocity signal from sensor 29 via line 30 and an output clutch velocity from sensor 31 via line 32. The current position of the actuator 12 (and hence the current clutch release bearing position) is also communicated to the ECU 20 by sensor 12b via line 33.

Any of the signals above may be generated by sensors which are directly connected to other electronic systems in the vehicle, and then measured values are transferred to the ECU 20, for example by a data network such as a CAN within the vehicle.

Figure 2:
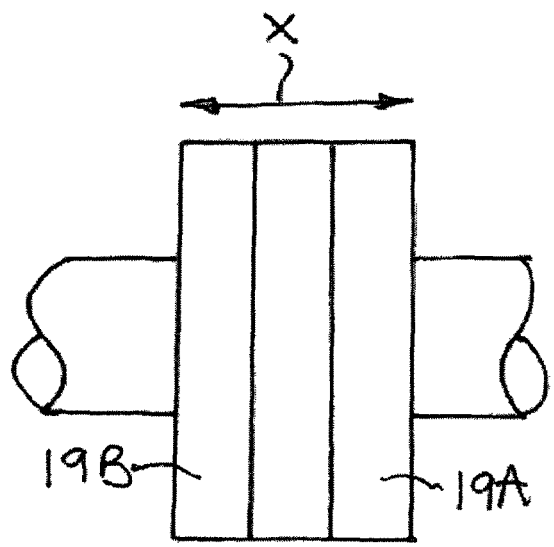
FIG. 2 shows diagrammatically the range of movement of the clutch release bearing.

In the clutch arrangement described below, movement of clutch release bearing 19 to the left releases the clutch and movement to the right engages the clutch (see FIG. 2). The release bearing is moveable between a fully engaged position 19A shown diagrammatically in FIG. 2 in which the clutch can transmit the maximum torque capacity of the clutch without slip and a disengaged position 19B in which the clutch cannot transmit any significant torque. At release bearing positions between end positions 19A and 19B the clutch may be slipping at various Slip Velocities depending on the level of torque currently being directed through the clutch.

ECU 20 issues signals to actuator 12 in accordance with a number of differing Vehicle Operation Modes defined by different combinations the status of predetermined operating criteria in order to achieve smooth clutch engagement with resulting low clutch wear and to damp torsional vibrations in the vehicle drive line to resolve noise and vibration problems and give lower stressed drive line components.

Figure 3:
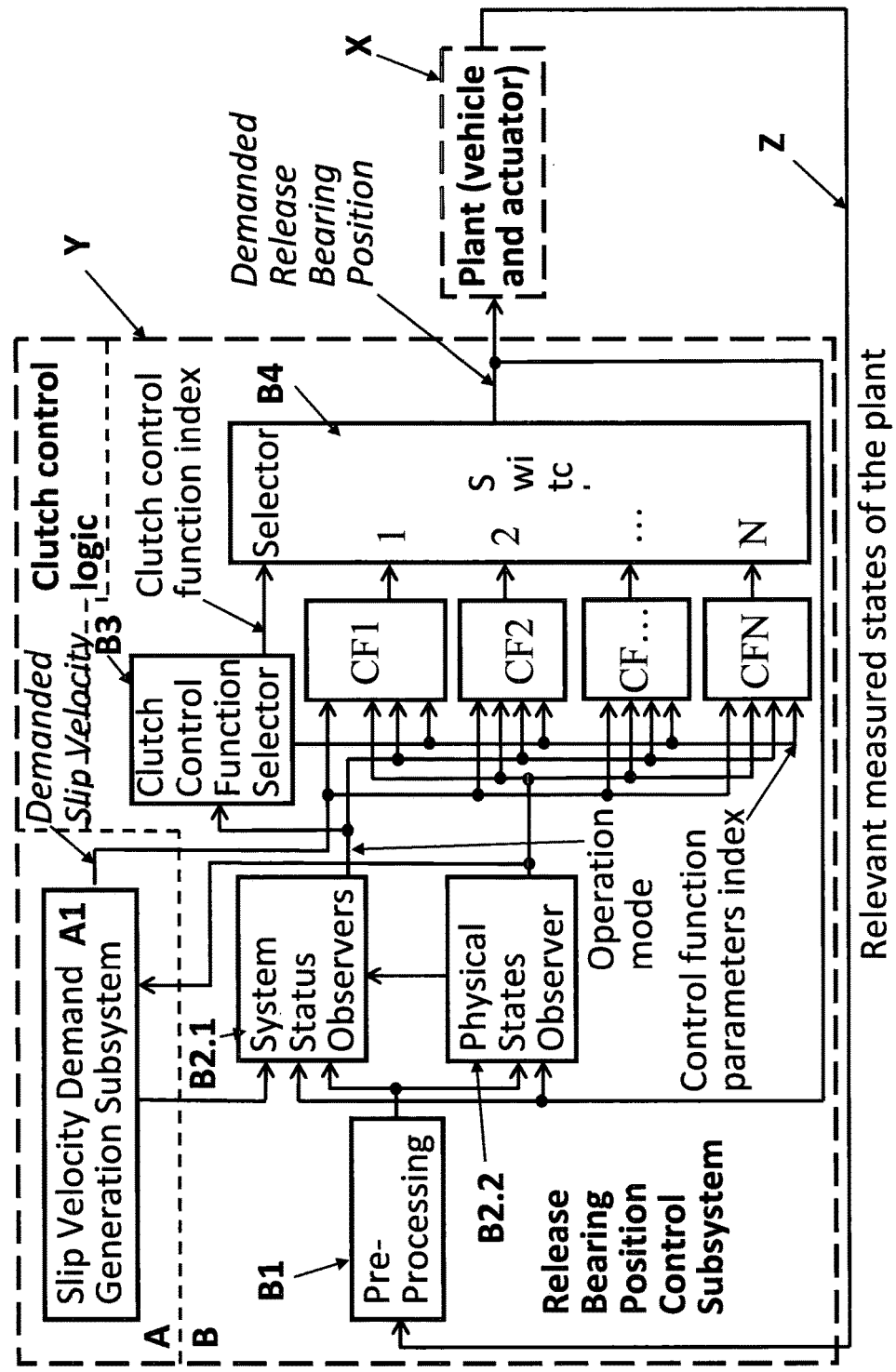
FIG. 3 shows an example of an input-output diagram of the clutch control system in accordance with the present invention.
Figure 4:
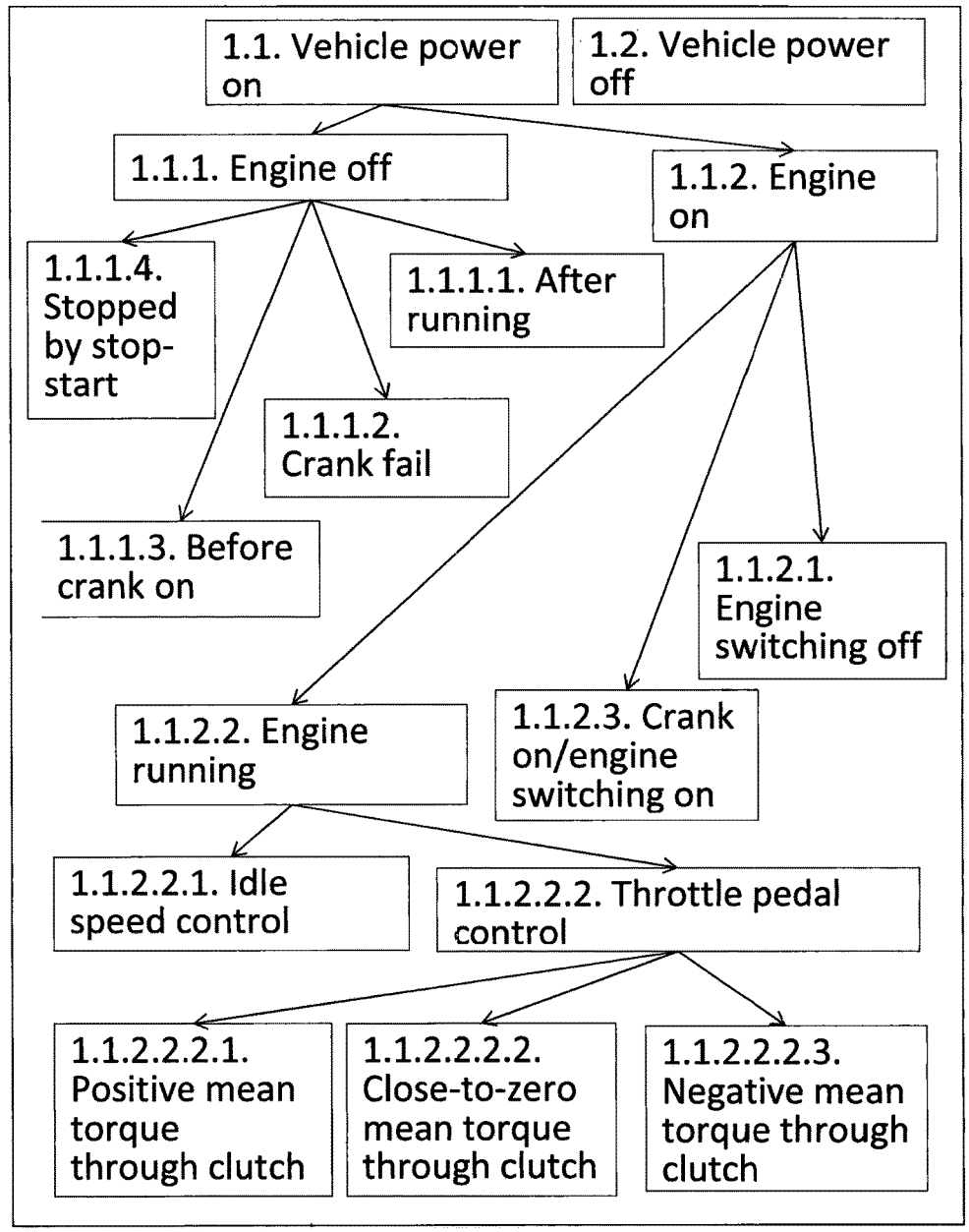
FIG. 4 shows the operation states based on the Power Status of the Vehicle criterion.
Figure 5:
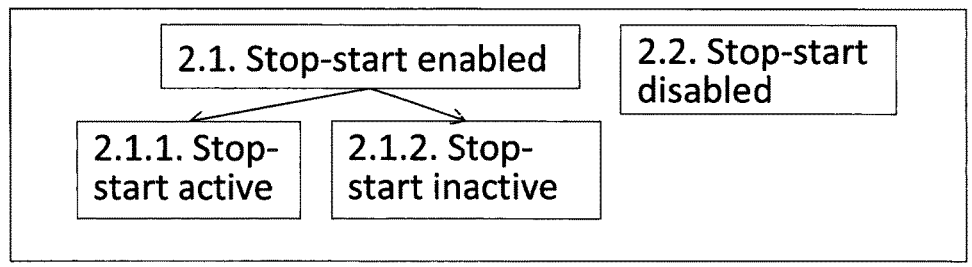
FIG. 5 shows the operation states based on the Stop-Start System Status criterion.
Figure 6:
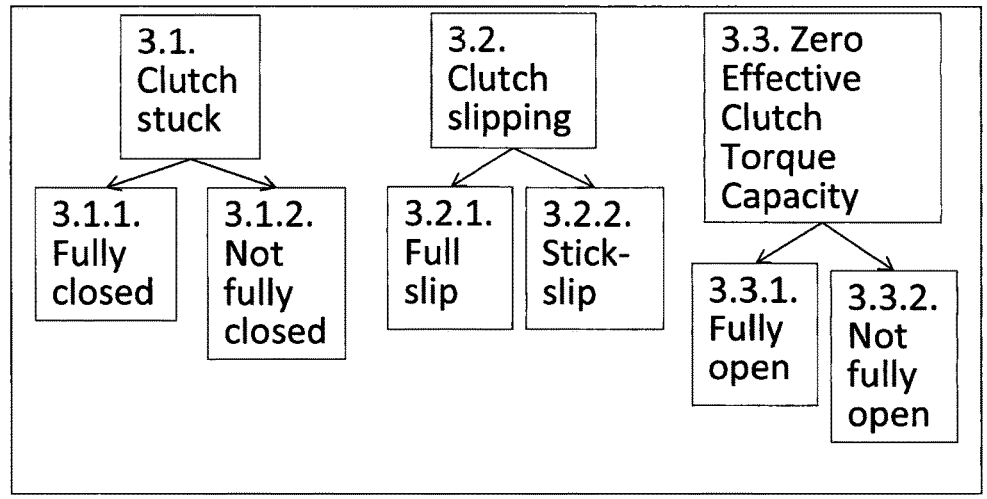
FIG. 6 shows the operation states based of the Clutch Slip Status criterion.
Figure 7:
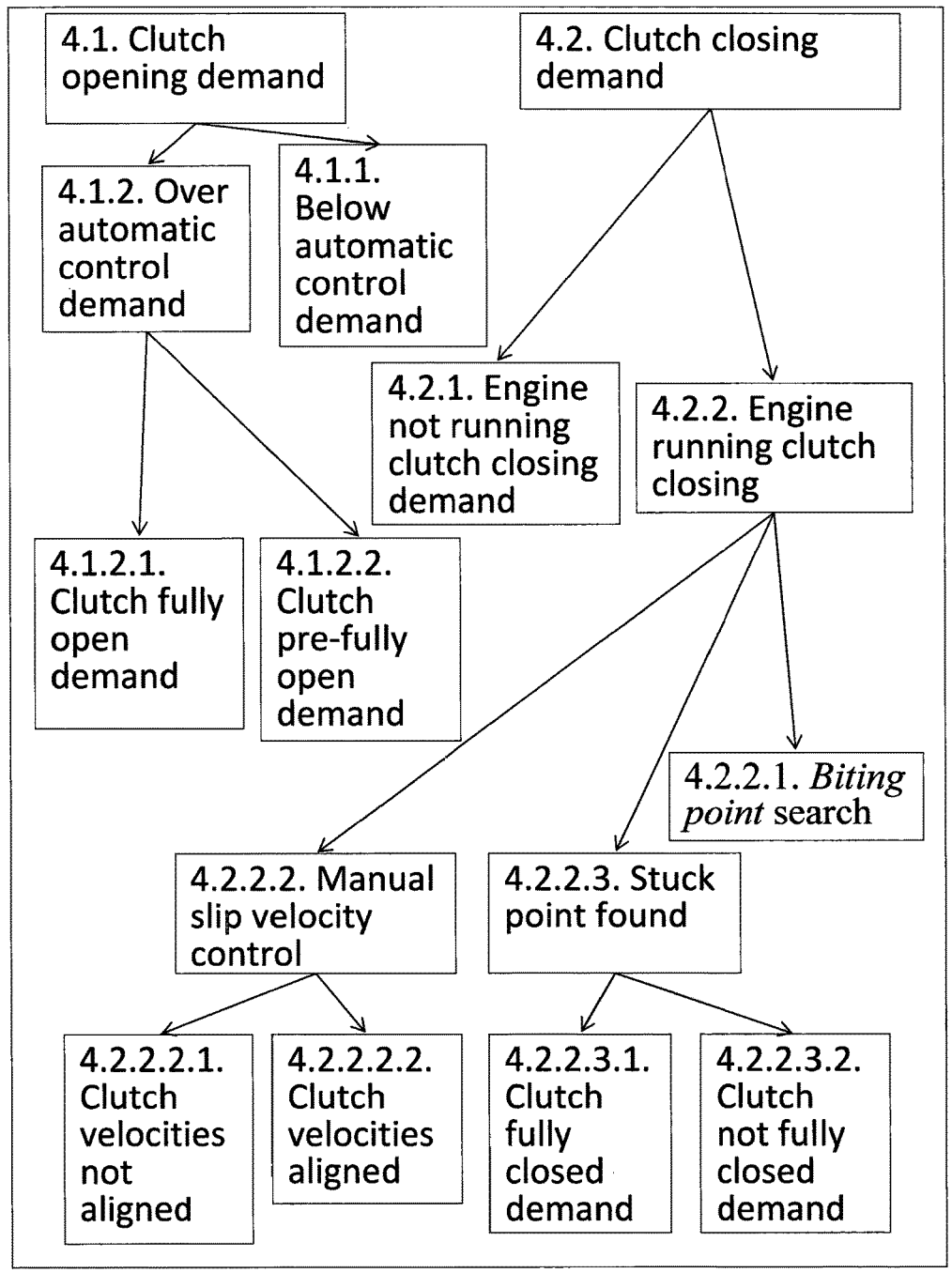
FIG. 7 shows the operation states based on the Manual Clutch Position Control Input Interface Status criterion.
Figure 8:
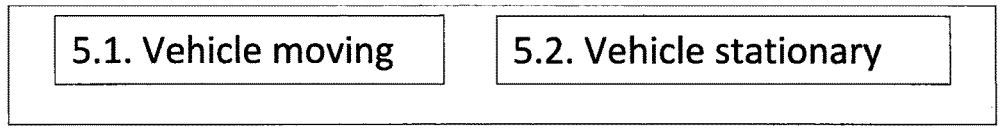
FIG. 8 shows the operation states based on the Vehicle Velocity Status criterion.
Figure 9:
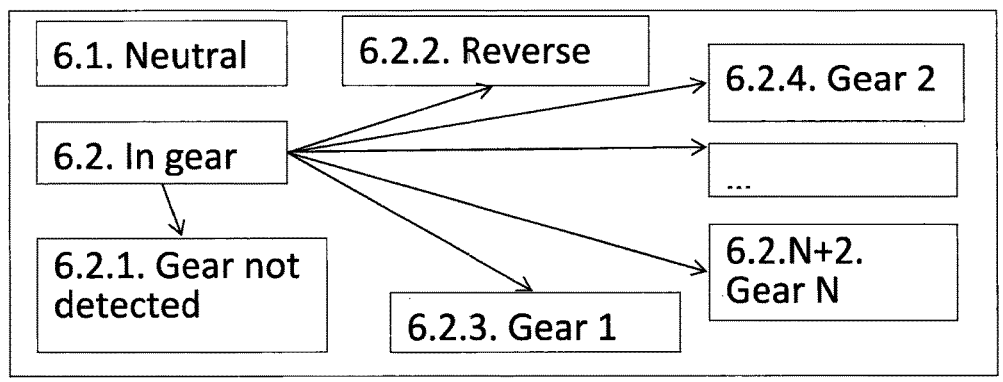
FIG. 9 shows the operation states based on the Gear Detection Status criterion.
Figure 10:
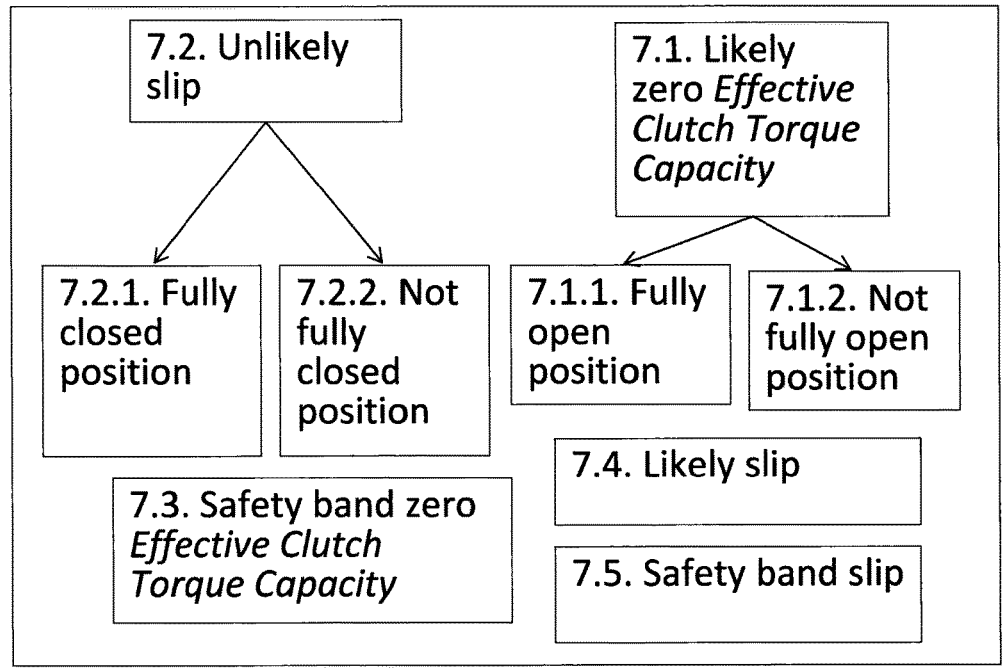
Figure 11:
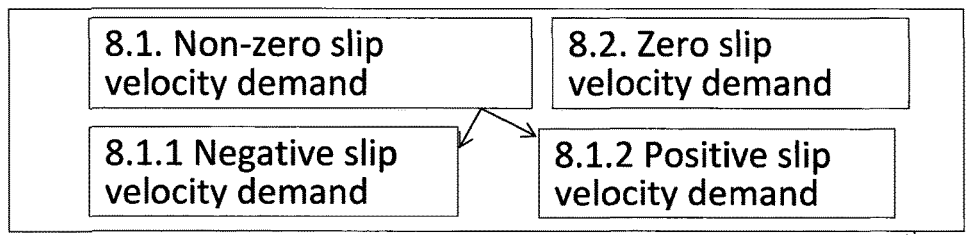
FIG. 11 shows the operation states based on the Slip Velocity Demand Status criterion.
Figure 12:
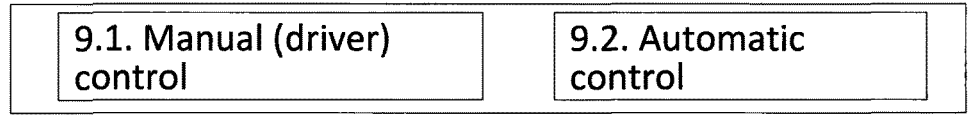
FIG. 12 shows the operation states based on the Automatic/Manual Control Status criterion.
Figure 13:
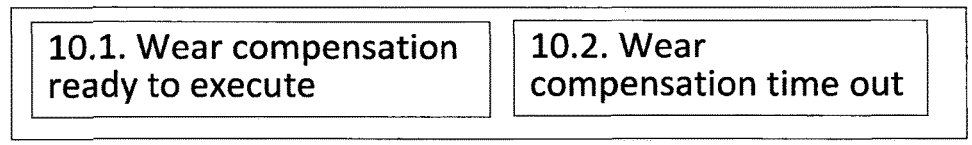
FIG. 13 shows the operation states based on the Wear Adjuster Status criterion.

FIG. 3 is a control block/input-output diagram in which box X represents the vehicle plant that is all the physical/logic components of the car, including the clutch, clutch actuation mechanism and the clutch actuation mechanism control logic, as well as the driver. Box Y in FIG. 3 represents the clutch control logic.

The inputs into the clutch control logic will typically consist of the signals representing the relevant measured plant states or states estimated by the appropriate observer or sensor technology within existing powertrain control systems (e.g. engine control system) and transmitted to the clutch control logic via a Controlled Area Network (CAN). The inputs that are typically necessary for the implementation of the clutch control logic on a dedicated hardware are:

- Measured/estimated vehicle wheels rotation velocity/speed
- Vehicle power mode/key status
- Signal representing stop-start system state if a stop-start system is provided
- Flywheel rotation velocity/speed
- Input shaft rotation velocity/speed (or any other component velocity/speed downstream from the clutch friction interface but upstream the first gearbox gear along the torque transmission path from the engine to the road)
- Manual clutch position control input interface
- Neutral gear sensor (alternatively gear lever position from which one can infer whether the vehicle is in neutral or not)
- Reverse gear sensor
- Torque at the engine/crankshaft
- Driver torque request to the engine control system
- Throttle pedal position The outputs of the clutch control logic would typically constitute the

- Demanded Release Bearing Position
- Vehicle Operation Mode detected by the clutch control logic (such information may be used by vehicle manufacturers to enable development of other control systems)
- Signal to request the inhibit of the start/crank on of the engine
- Signal to request the inhibit of switching the vehicle power off (e.g. if driver is using the manual clutch control input interface after indicating the intention to switch the vehicle power off)

The control system determines the current Vehicle Operation Mode with regard to a series of predefined operating criteria. These criteria are combined to give a series of predetermined Vehicle Operation Mode and the control system applies a different clutch control strategy, depending on the current Vehicle Operation Mode, to achieve the Demanded Slip Velocity and provide a transition between different Vehicle Operation Modes without exciting an uncomfortable level of vibration in the driveline.

The control system is configured to recognise a plurality of predetermined Vehicle Operation Modes of the vehicle defined by the combination of a Clutch Slip Status criterion as hereinbefore defined with one or more of the hereinbefore defined operating criteria of Manual Clutch Position Control Input Interface Status, Release Bearing Position Status and Slip Velocity Demand Status and, dependent on the recognised Vehicle Operation Mode, the control system applies a different clutch control strategy to achieve the Demanded Slip Velocity and provide a comfortable transition between the different Vehicle Operation Modes.

In one implementation, the control system is configured to recognise a Vehicle Operation Mode defined by a combination of the criteria of Clutch Slip Status, Slip Velocity Demand Status and Release Bearing Position Status.

For example, the control system recognises the Vehicle Operation Modes corresponding to the following conditions:
a) the clutch is slipping or stick-slipping, but zero Slip Velocity is required;
b) the clutch is slipping or stick-slipping and non-zero Slip Velocity is required;
c) the clutch release bearing position is between the fully engaged and fully released positions at a position sufficient to transmit all engine torque without clutch slip and non-zero Slip Velocity is required, and
d) the clutch release bearing position is between the fully engaged and fully released positions at a position sufficient to transmit all engine torque without clutch slip and zero Slip Velocity is required.

The control system can also be configured to recognise additional Vehicle Operation Modes which are defined by the inclusion of one or more of the hereinbefore defined operating criteria of Power Status of the Vehicle, Stop-Start System Status, Vehicle Velocity Status, Gear Detection Status, and Manual/Automatic Control Status.

FIGS. 4 to 13 show diagrammatically the states within the above referred to operating criteria:

- Power Status of the Vehicle—(See FIG. 4) indicates the current operating state of the engine such as whether the electrical power is on, whether the engine is running, whether the engine is idling or controlled by the throttle pedal, and the current torque delivery of the engine. These conditions can, for example, be communicated to the control system from observers or sensors via a data network such as a Controller Area Network (CAN) provided on the vehicle.
- Stop-Start System Status—(See FIG. 5) indicates whether a stop-start function provided on the vehicle is enabled and active. Again this status is available via the CAN.
- Clutch Slip Status—(See FIG. 6) indicates the current state of engagement of the clutch, for example, whether the clutch is slipping, stick-slipping (rapid change between stick and slip condition, occurring at a frequency higher than the cyclic torque variation associated with the engine combustion process), stuck, closed or open.
- Manual Clutch Position Control Input Interface Status—(See FIG. 7) indicates whether the vehicle driver is currently demanding the clutch to be open, closed or the driver is in the process of closing or opening the clutch, as well as the stage of this process. This is typically done by monitoring the position of the clutch pedal (or other driver operated clutch control input interface).
- Vehicle Velocity Status—(See FIG. 8) indicates whether the vehicle is stationary or moving.
- Gear Detection Status—(See FIG. 9) indicates which gear is currently selected in the associated gearbox, including neutral and reverse.
- Release Bearing Position Status (or other clutch actuation mechanism)—(See FIG. 10) indicates the current position of the release bearing relative to some pre-defined position, e.g. position where the clutch is predicted to start slipping, position where the clutch is predicted not to transmit any torque, position where the clutch is predicted to be stuck, fully open or position where the clutch is fully closed.

Slip Velocity Demand Status—(See FIG. 11) this criterion is specific to the operation of the control logic of the clutch control system. Particularly, as described below, the clutch control logic has a Slip Velocity Demand Generation Subsystem. Different operation mode can defined based on whether the non-zero Slip Velocity is demanded or no slip (i.e. zero Slip Velocity) is demanded by this subsystem.

Manual/Automatic Control Status—(See FIG. 12) this criterion is based on whether the clutch release bearing position is controlled manually via the driver's clutch pedal or automatically by the control system ignoring the clutch pedal position.

Wear Adjuster Status—(See FIG. 13) if an automatic clutch wear adjuster is present in the mechanical clutch actuation system, the control system can employ a timed wear adjuster compensation control strategy that periodically fully closes the clutch when appropriate. In this case the wear adjuster status would indicate if it is time to close the clutch or not.

In FIGS. 4 to 13 the arrows show the connection of the various states of operation within each criterion (the direction of the arrows indicates the substates of a state. More details about the individual states within these criteria are provided in tabular form in FIG. 14A to 14I. Therefore, for each status, its substates can be arranged in a tree-like structure with several levels of hierarchy. The numbers associated with the substates represent the indices at each level of the hierarchy of a substate in its status tree.

As indicated above, these criteria are combined to give a series of predetermined modes of operation of the vehicle and the control system applies a different clutch control strategy, depending on the current Vehicle Operation Mode, to achieve the Demanded Slip Velocity and provide a comfortable transition between different Vehicle Operation Modes.

FIG. 15 shows in more detail in tabular form examples of the Vehicle Operation Modes, within the above criteria, which define two examples of predetermined Vehicle Operation Modes of the vehicle. Examples of the operating states which define other Vehicle Operation Modes are shown in FIGS. 29A to 29D.

Thus, for example, referring to FIG. 15, a first mode (1) of operation of the vehicle corresponds to the engine crankshaft rotating under control of the throttle pedal, the stop-start system inactive, the clutch being in the stick-slip mode, the driver demanding the clutch to be closed, the vehicle being either moving or stationary, the second gear being engaged, the release bearing being positioned over the Under-Predicted Position and under the Predicted Position, non-zero slip being demanded by the Slip Velocity Demand Generation Subsystem and the clutch release bearing position being under automatic control.

A second mode (2) of operation of the vehicle also shown in FIG. 15 corresponds to the engine being switched off by the stop-start system, the stop-start being active (i.e. interfering with the engine control), the clutch not transmitting any torque, the driver demanding the clutch to be fully closed, the vehicle being stationary, any gear being engaged, the clutch being fully open, any Slip Velocity being demanded by the Slip Velocity Demand Generation Subsystem and the clutch release bearing position being under automatic control.

The clutch control logic (box Y) can be split into two subsystems, one of which defines the required level of clutch Slip Velocity (Slip Velocity Demand Generation Subsystem), and another one that ensures that this Slip Velocity is achieved and other operation performance targets are met (Release Bearing Position Control Subsystem) through control of the clutch release bearing position by actuator 12. Both subsystems are shown using dotted rectangles A and B respectively in FIG. 3.

Figure 16:
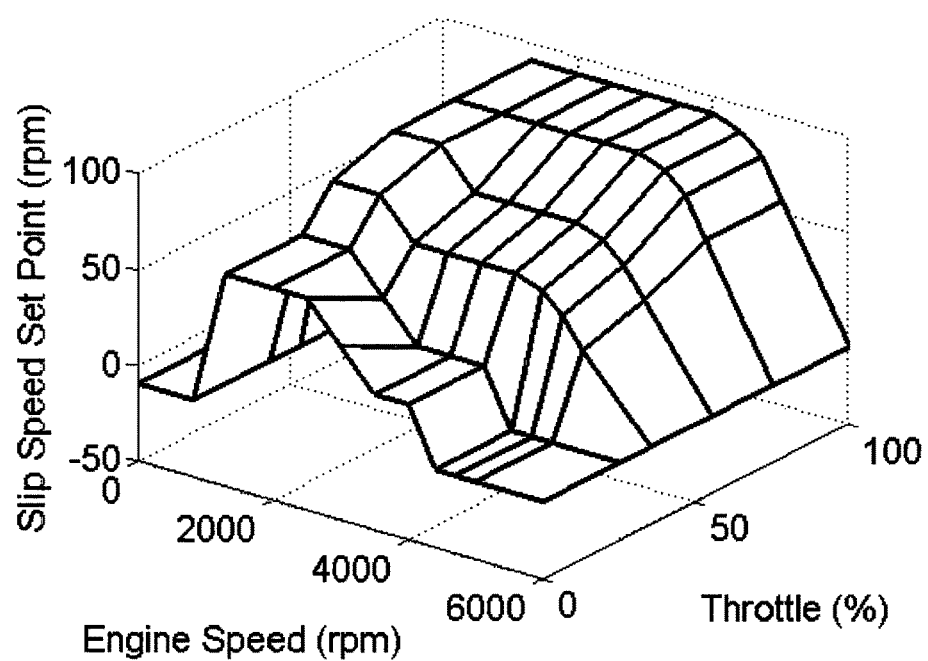
FIG. 16 shows of a Slip Velocity demand map used in the control strategy of the present invention.

The first subsystem (box A) defines the required level of clutch Slip Velocity based on a pre-defined algorithm (Slip Velocity Demand Generation Subsystem). For example, this algorithm could be based on a stored multi-dimensional Slip Velocity demand map. An example of such a map is shown in FIG. 16 in which the Slip Velocity demand map is determined with respect to observed powertrain component velocity and throttle position. Different Slip Velocity demand maps may be used depending on the selected gear.

Generally, the algorithm could take into account the torque measured somewhere in the vehicle powertrain, and could include dynamic effects. For example, the rate of change of Slip Velocity demand could be limited. The Slip Velocity demand map may also be generated in dependence on the dynamic performance characteristics of the engine to improve the acceleration characteristics of the vehicle.

The Release Bearing Position Control Subsystem (box B) can be subdivided in several stages of information processing. As shown in FIG. 3, this subsystem receives the inputs from the appropriate sensor-observer technology installed on the vehicle (represented by box X) via line Z. The subsystem processes these inputs indicated by box B1 to convert the information into physical/normalised units and uses this information to estimate additional states of the vehicle via appropriate internal observers indicated by box B2. These observers can also take into account some of the internal control logic states, such as the clutch actuation mechanism position demand and Vehicle Operation Mode. The observers can be divided into two types: system status observers indicated by box B2.1 and physical state observers indicated by box B2.2. The outputs of the system status observers B2.1 are combined into a single variable (e.g. signal bus) containing the information about the active Vehicle Operation Mode. The output of the system status observers B2.1 is received by the hereinafter defined Clutch Control Function Selector block in box B3. The outputs of both the system status observers B2.1 and the physical system observers B2.2 are then used as inputs to the Demanded Release Bearing Position control functions provided by boxes CF1 to CFN, as well as the subsystem responsible for the Slip Velocity demand generation indicated by box A1.

The Clutch Control Function Selector Block indicated by box B3 defines which control function CF1 to CFN must be activated and which modifying parameters for this selected control function may be appropriate. These modifying parameters, which depend on the system status information provided by the system status observers, are selected by the Control Function Selector Block and are indicated in FIG. 3 by the control function parameter index signal which goes to each control function CF1 to CFN. In the example described, the use of modifying parameters allows the same basic five control function CF1 To CF5 (with appropriate modifying parameters) to be used to provide the appropriate release bearing position signal for all the Vehicle Operation Modes. FIG. 23 indicates the basic nature of each of the available control functions.

If each control function is assigned a unique index, the Clutch Control Function Selector Block can be implemented as a pre-defined lookup table that takes the system status information as the input and maps the appropriate control function index along with the appropriate control function modifying parameters index to each physically possible Vehicle Operation Mode. The two outputs of the Clutch Control Function Selector Block are the index of the appropriate control function and the index of the modifying parameters set for this control function. Based on these outputs a relevant clutch position control function is selected by the multiport switch B4 from the alternatives available from boxes CF1 to CFN with an appropriate set of modifying parameters for each Vehicle Operation Mode. Each of these alternatives takes the observed states as the input and outputs its own demanded clutch release bearing position. To ensure smooth transition between control functions appropriate tracking strategies can be used. Also, where saturation of a particular control function is needed by design, appropriate anti-windup strategies must be employed.

The important system status observers are the Power Status of the Vehicle Observer, Stop-Start System Status Observer, Clutch Slip Status Observer, Manual Clutch Position Control Input Interface Status Observer, Vehicle Velocity Status Observer, Gear Detection Status Observer, Release Bearing Position Status Observer, Slip Velocity Demand Status Observer and Wear Adjuster Status Observer. These observers (box B2.1) determine the current mode of operation of the vehicle and hence which control function CF1 to CFN is to be used.

Additionally Mean Slip Velocity Observer(s), Mean Transmission Windup Velocity Observer(s), Mean Slip Acceleration Observer(s), Mean Transmission Windup Acceleration Observer(s), Predicted Position Observer, Under-Predicted Position Observer are provided. The algorithms that can be used for implementation of these observers are described below.

The Power Status of the Vehicle Observer would typically be implemented as a state machine that reinterprets the power mode status and stop-start system status signals available on CAN of the vehicle—it would typically be application specific, as the CAN signals for power mode status of the car are not standardised between different cars/vehicle manufacturers.

The Stop-Start System Status Observer would typically be implemented as a state machine that reinterprets the power mode status and stop-start system status signals available on CAN of the vehicle—again it would typically be application specific, as the CAN signals for power mode status of the car are not standardised between different cars/vehicle manufacturers.

The clutch control logic also includes a Clutch Slip Status Observer. As one of its inputs the observer would take the observed Slip Velocity (possibly filtered using some form of low pass filter to remove the spectral components related to the oscillations of the values of the velocities of the components due to cyclic torque variation of the engine), as well as the current Vehicle Operation Mode.

Such an observer must be able to cope with the noise present in the Slip Velocity signal due to "shunt" or "judder" driveline torsional vibrations, or vibrations related to the mode of operation of the closed loop Slip Velocity control. All of these vibrations typically have the fundamental spectral components lying within the range of 0.5-15 Hz. Thus, a hysteresis may be introduced into the logic of the observer based on two arbitrarily set thresholds for the maximum and minimum Slip Velocity limits. The Clutch Slip Status Observer will only detect slip if the Slip Velocity is above a certain maximum slip threshold.

However, if the clutch is already slipping, the Clutch Slip Status Observer will assume that the clutch is slipping until the minimum slip threshold is reached. Additionally, when the clutch is under closed loop Slip Velocity control (i.e. one of the modes of operation of the clutch control logic—see description below), it is likely that after the clutch started slipping, it will either keep slipping or will be very close to the position where it can start slipping very quickly even if the measured Slip Velocity is below the minimum slip threshold. Thus, when the control logic is operating in the closed loop Slip Velocity control mode, the clutch can be assumed to be always slipping until zero slip is demanded by the Clutch Slip Status Observer.

The Manual Clutch Position Control Input Interface Status Observer takes the measured and processed position (either angular or longitudinal) of the manual input interface as its input and determines whether the driver is trying to open the clutch, close the clutch, maintain clutch open position or maintain clutch closed position. Also, the observer subdivides the states describing opening and closing the clutch into substates representing sequences that are typically employed by the driver to open or close the clutch. The observer can be implemented as a state machine that compares the manual input interface position with appropriate thresholds to determine whether the driver intends to maintain open/closed position, as well as by comparing the estimated clutch pedal motion velocity with the appropriate thresholds to determine whether the driver intends to open the clutch or close the clutch. To understand which state of the opening or closing the clutch sequence should be activated the state machine of the observer can rely on the measured or observed physical states of the driveline and the clutch. For example, instantaneous Slip Velocity and slip acceleration can be used to determine whether the driver matched the velocities on both sides of the clutch friction interfaces while closing the clutch. The estimated position of the Biting Point (the position of the release bearing where the clutch starts to transmit torque) can be used to determine whether the driver has reached it while closing the clutch. The instantaneous Demanded Release Bearing Position or measured release bearing position can be used to determine whether the driver's release bearing position demand input has exceeded the position of the release bearing demanded by one of the automatic control functions.

The Vehicle Velocity Status Observer takes the measured and processed vehicle velocity measurement (alternatively wheels rotational velocity) as its input and determines whether the vehicle is moving or stationary by comparing the aforementioned input with the appropriate thresholds.

The Gear Detection Status Observer uses the information either from a
  Gear lever position sensor. Such sensor could allow determination of the selected gear via direct calculation, provided the geometry of the gear lever is known.
  Neutral sensor in combination with the measured angular velocity of two components of the transmission: one component after the clutch friction interface, but before the any gear connection along the torque transmission path from the engine to the wheels, and one component after the differential gear or the differential gear itself along the torque transmission path from the engine to the wheels. An example of such components could be a gearbox input shaft and the wheels of the vehicle. Then the gear can be determined by comparing the ratio of the velocities of the two components with the known gear ratios of the gearbox.

The Release Bearing Position Status Observer can take a measured or estimated release bearing position and use pre-defined thresholds and inputs from the Under-Predicted Position Observer and Predicted Position Observer to determine which of the hereinbefore defined modes of the Release Bearing Position Status applies. The estimation of the release bearing position could be based on the measurement taken from a clutch actuation mechanism sensor, such as a motor position sensor or encoder.

The Slip Velocity Demand Status Observer takes the signal representing the Slip Velocity demand as its input and uses appropriate thresholds to determine whether zero, positive or negative Slip Velocity is demanded.

The Manual/Automatic Control Status Observer takes the index of the selected control function CF1 to CFN as the input and determines whether or not the driver's input is directly affecting the position of the clutch release bearing.

The Wear Adjuster Status Observer is based on a timer that is reset each time the clutch stays fully closed for a certain pre-defined time. Thus, if the observer can have two states indicating whether it is time to close the clutch fully or not so that the wear adjuster can reset.

Figure 18:
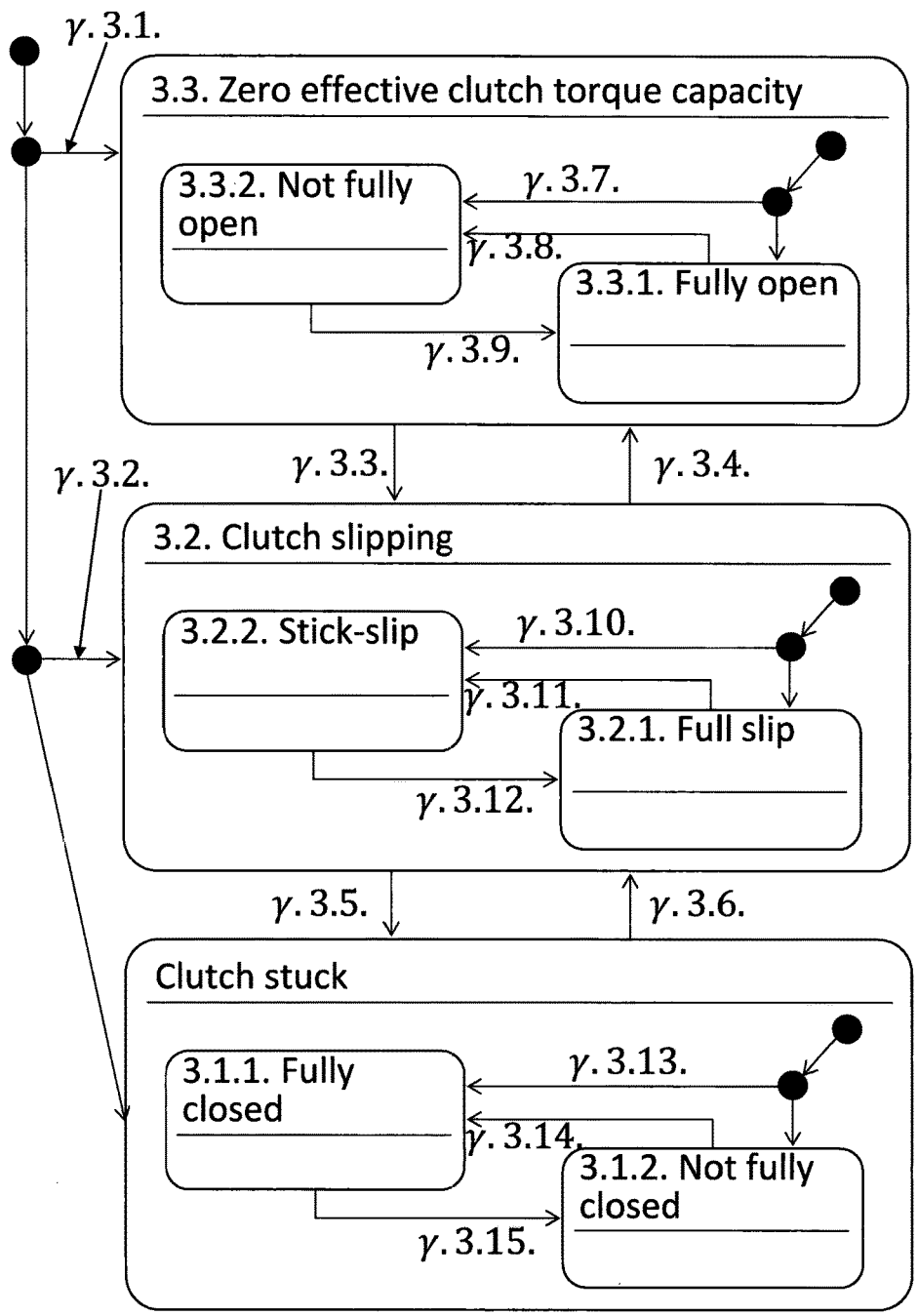
FIG. 18 shows the state machine for the Clutch Slip Status Observer.

Two examples of vehicle system status observers are given in FIG. 18 and FIG. 19 in the form of UML (Unified Modeling Language) state machines. The notation for the state machines is presented in FIG. 17. FIG. 18 presents an example of the Clutch Slip Status Observer. FIG. 19 presents an example of the Slip Velocity Demand Status Observer. The inputs to both observers are shown FIG. 20. The parameters used in these observers are shown in FIGS. 21A and 21B. The transition conditions are shown in FIGS. 22A and 22B. Both observers output their active states. For example, in FIG. 19, the output of the Slip Velocity Demand Status Observer could be 8.2. This output means that the Zero Slip Velocity Demand is the active state. Alternatively, the output of the same observer could also be 8.1.2. This output suggests that the Non-Zero Slip Velocity Demand is the active state with the active substate Positive Slip Velocity Demand. In FIG. 18, the output of the Clutch Slip Status Observer could be 3.2.2., suggesting that the clutch is operating in a Stick-Slip state.

Referring now to the physical state observers, the mean Slip Velocity across the clutch is provided by the Mean Slip Velocity Observer. This Slip Velocity is determined by an algorithm that compares the clutch input velocity from sensor 29 with the clutch output velocity from sensor 31 or a sensor associated with wheel 15 or estimated velocity of any other transmission component. Signal filtering (e.g. a low pass filter or model based closed loop observer) can be used to remove the effects of the high frequency oscillations of the Slip Velocity due to the engine combustion excited cyclic torque variation.

The transmission windup velocity is determined by an algorithm that compares the angular velocity of the rotation of the wheels 15 with the clutch output velocity from sensor 31. Signal filtering (e.g. a low pass filter or model based closed loop observer) can be used to remove the effects of the high frequency oscillations of the Slip Velocity due to the engine combustion excited cyclic torque variation.

The Mean Slip Acceleration Observer and Transmission Windup Acceleration Observers are based on the inputs from the same sensors/estimates as the Slip Velocity and velocity windup observers, but output the acceleration instead of speed or velocity. These acceleration signals can be obtained via numerical differentiation of the mean Slip Velocity or velocity signals or a model based closed loop observer.

The clutch control logic includes an algorithm that constantly calculates the clutch release bearing position that is just sufficient to transmit the instantaneous torque at the clutch friction interface without slip. The Effective Clutch Torque Capacity corresponding to this position will be referred to as the Predicted Effective Clutch Torque Capacity in what follows. The position of the release bearing corresponding to the Predicted Effective Clutch Torque Capacity is referred to as the Predicted Position and the algorithm is termed the Predicted Position Observer. The inputs or parameters of the algorithm, which calculates this position, are typically the observed mean engine torque, characteristics of the most significant spectral components of the cyclic torque variation due to the combustion process of the engine (typically the fundamental frequencies involved in the oscillations occur at a frequency higher than 15 Hz, but can occur at a lower frequency for one and two cylinder engines), mechanical characteristics of the clutch (e.g. inner and outer radii of the friction surfaces, the number of fiction surfaces and the friction coefficient of the clutch) and resistance torque applied to the clutch from the transmission side or other inputs that would allow to estimate this resistance torque (e.g. the resistance torque at the wheels of the car in conjunction with sufficient information about the drivetrain system to allow model based observation of sufficient accuracy). This observer would typically use a pre-defined or measured (e.g. via an adaptive parameters estimation algorithm) release bearing position-clamp force characteristic of the clutch, as well as mechanical characteristics of the clutch and estimated friction coefficient to determine the position of the actuator where the clutch should start slipping according to the measured or estimated torque applied by the engine.

The Under-Predicted Position Observer takes the output of the Predicted Position Observer and applies a certain pre-determined safety factor or offset to determine the Under-Predicted Position of the release bearing at which the clutch is not going to slip, yet is as close as feasible to the position where the clutch starts slipping. Alternatively, this calculation could be based on the Predicted Effective Clutch Torque Capacity. The Effective Clutch Torque Capacity corresponding to the Under-Predicted Position will be termed the Under-Predicted Effective Clutch Torque Capacity in what follows.

The description also presents an example of a lookup table that could be used for the definition of the Clutch Control Function Selector Block (box B3 in FIG. 3) together with the description of the clutch release bearing position control functions that can be used in conjunction with this block. The lookup table for the Clutch Control Function Selector Block is shown in FIGS. 29A to 29D. The control functions used in this example are described below textually with the accompanying simplified control diagrams presented in FIG. 24—FIG. 28.

As indicated above, in the example described, five types of control functions are used with various parameterisations (i.e. the application of different modifying parameters) depending on the active Vehicle Operation Mode. These control functions are summarised in the table in FIG. 23:

Manual Control Function (CF1). This control function processes the input from the sensor(s) associated with the manual clutch control interface and converts it into the demanded clutch release bearing position. The aim of this function is to provide the driver comfortable means to actuate the clutch release bearing. Particularly, the function can process the input by applying dynamic effects such as rate limiter or a model of a hydraulic mechanism to replicate the operation of a clutch with a hydraulic/mechanical actuation mechanism. An example of the implementation of this function using a $2^{nd}$ order linear time invariant system is shown in FIG. 24.

Closed Loop Slip Velocity Control Function (CF2). This control function is aimed at delivering a controlled position of the release bearing to achieve and maintain the clutch Slip Velocity demanded by the Slip Velocity Demand Generation Subsystem through control of the Demanded Release Bearing Position. Typically, this function would include a feedforward signal that is aimed at cancelling the disturbance associated with the changes in the engine torque, resistance torque applied to the wheels, as well as the transient dynamic effects associated with the vibration modes of the powertrain system. Moreover, the control function should include a closed loop strategy (e.g. a PID control law or a model based state feedback-integral control law) to compensate for the inaccuracies of the feedforward control law. The PID or the integral term of the state feedback-integral control law should minimise the difference between the Demanded Slip Velocity and the actual Slip Velocity at the clutch. This function could also benefit from using an appropriate feedback linearisation strategy to compensate for the nonlinearity associated with the actuator and clutch axial spring system. An example of the Closed Loop Slip Velocity Control Function based on the PID control law in conjunction with a feedforward law based on two-degrees of freedom model of a slipping clutch is shown in FIG. 25.

Constant Gradient Effective Clutch Torque Capacity Torque Ramp with respect to a Feedforward Reference Signal (CF3). This function changes the Demanded Release Bearing Position in such a way that the Effective Clutch Torque Capacity is either increased or decreased at a constant rate with respect to a reference to a feedforward signal (if no reference is needed the feedforward signal can be set to constant) until either zero or maximum Effective Clutch Torque Capacity is reached or control is passed to another control function. If the clutch includes a nonlinear axial spring system, the torque vs. release bearing position relationship that is needed for the robust operation of this function can be found using either a pre-defined dynamic interpolation lookup table based on the measurement of the clutch clamp force vs. release bearing (and making appropriate assumptions regarding the clutch geometry and clutch friction coefficient) or obtained using an adaptive clutch parameters estimation strategy. An example of the implementation of this function is shown in FIG. 26.

Constant Gradient Release Bearing Position Ramp with respect to a Feedforward Reference Signal (CF4). This function demands to change the release bearing position at a constant rate until either the maximum or minimum position thresholds are reached (thresholds are subject to parameterisation for each particular mode of operation). After the minimum or the maximum position is reached the function keeps the release bearing position at this constant minimum or maximum position, respectively. An example of the implementation of this function is shown in FIG. 27.

Release Bearing Position Tracking Function (CF5). This function tracks a pre-defined input and ensures that a "smooth" transition can be made to the tracking signal from other control functions, i.e. there are no jumps in the release bearing position demand when the transition from any other control function is made to the release bearing position tracing function. An example of the implementation of this function is shown in FIG. 28.

All of the aforementioned functions must have appropriate strategies for output tracking and anti-windup to ensure smooth transition can be made between different control functions. To simplify the explanation these strategies are not present in the diagrams of the examples of the control functions. The operation of the aforementioned functions in the context of the entire system operation is described below.

As indicated above, FIGS. 29A to 29D show an example of the Clutch Control Function Selector Block lookup table. This is an example of the control logic which can be used in box B3 of FIG. 3. Thus, for example, if the block detects that the vehicle power is on, the engine is switched off (before cranking on) and the gear is selected (i.e. it detects a particular mode of operation), it outputs the control function index 1 to invoke the Manual Control Function (CF1) with the appropriate set of modifying parameters (determined by the index associated with each mode that invokes a particular control function). For clarity the description of the purpose of the chosen control function during each particular mode of operation of the system is presented in the "Description" column of the table in FIGS. 29A-29D. The "Vehicle Operation Mode" column indicates the vehicle criteria states which must be present to define each Vehicle Operation Mode.

From the diagrams and the tables referred to above it can be seen that in certain conditions the system can activate the Manual Control Function (CF1). As described above, if this function is active the commanded clutch release bearing position is dependent on the position of the clutch pedal 18. If the Manual Control Function is not active, then the position of the clutch is controlled automatically and the commanded position is determined by the torsional vibrations in the associated drive line or other operating states of the associated vehicle.

The Manual Control Function is chosen when the release bearing position demanded by the driver via pedal 18 is further towards the releasing position than the current position of the release bearing so that the system always provides the clutch engagement position demanded by the driver. The release bearing position demanded by the driver is determined using a pre-defined algorithm (CF1). One of the inputs to the algorithm is the position of the clutch pedal measured using Sensor 25.

When the release bearing is under automatic control (CF2-CF5), non-neutral gear is selected, the engine is running and no slip is detected, but non-zero Slip Velocity is required, the ECU is arranged to signal the actuator to move the clutch release bearing to the position where the slip is detected at a speed dependent on the current position and the current distance of the clutch from the Predicted Position. When the clutch release bearing position is far from the Predicted Position (e.g. under the Under-Predicted Position) the actuator moves the clutch release bearing at a fast speed and as the current position approaches the Predicted Position the speed of movement of the clutch release bearing is reduced. For example, the position demand in this condition could be obtained by summing a feedforward command based on the Predicted Effective Clutch Torque Capacity/ Predicted Position and an open loop term which ensures that the torque which can be transmitted through the clutch decreases at approximately constant rate with the reference to the torque at which the clutch starts slipping. This will ensure that the overshoot (in terms of the Slip Velocity) upon entering the closed loop Slip Velocity control (see below) is approximately independent of the mean engine torque value, the rate of change of torque supplied by the engine and the resistance torque applied to the driveline. For example, this behaviour can be achieved via control functions CF3 and CF4. In this case, CF4 would be used to control the demand of the release bearing position directly when the release bearing position is under the Under-Predicted Position to move the actuator at a fast constant rate towards the Under-Predicted Position. After the Under-Predicted Position is reached, the control should be passed to CF3 to achieve dependence of the rate of motion of the actuator on the instantaneous torque being passed through the clutch. In this case CF4 would not have a feedforward term and would be an open loop ramp function, while, CF3 would have a feedforward term based on the Predicted Effective Clutch Torque Capacity.

When the release bearing is under automatic control, non-neutral gear is selected, the engine is running, non-zero Slip Velocity is demanded and non-zero Slip Velocity is detected, the clutch release bearing position is determined based on a closed loop control algorithm (potentially in conjunction with appropriate feedforward or open-loop techniques) that attempts to minimise the error between the Slip Velocity demanded by the Slip Velocity Demand Generation Subsystem and the detected Slip Velocity. This behaviour can be achieved by activating CF2.

When the release bearing is under automatic control, non-neutral gear is selected, the engine is running and a zero Slip Velocity is set by the Slip Velocity Demand Generation Subsystem and the slip is detected, the actuator will close the clutch further until no slip is detected. For example, the position demand in this condition could be obtained by summing a feedforward command based on the Predicted Effective Clutch Torque Capacity/Predicted Position with an open loop term which ensures that the torque which can be transmitted through the clutch increases at a constant rate. This will ensure that upon making a transition from slip/ stick-slip to no slip the excitation of the driveline is approximately independent of the torque and the rate of change of the torque supplied by the engine. The aforementioned behaviour can be achieved by activating the CF3 with a feedforward term based on the Predicted Effective Clutch Torque Capacity.

When the release bearing is under automatic control, non-neutral gear is selected, the engine is running, zero Slip Velocity is required and no slip is detected, the clutch release bearing position commanded by the control logic may be set to be just sufficient to transmit the torque currently being delivered by the engine without any clutch slip occurring. This behaviour can be achieved by activating CF5 that tracks the Under-Predicted Position.

By operating the control system in this manner the clutch release bearing position can be maintained just sufficiently engaged to ensure that no clutch slip occurs. Therefore, when non-zero slip is demanded this can be quickly achieved as only a small movement of the release bearing is required. Also if there are any sudden shock torques imposed on the driveline due to, for example, the vehicle landing after jumping off the ground or having road wheels on a surface where the coefficient of friction changes suddenly, the clutch can slip and alleviate the torque shocks, thus reducing the chance of damage to the drive line.

Alternatively, when in automatic mode and zero Slip Velocity is required and no slip is detected by the system, the clutch can be arranged to be moved to its fully engaged position by the actuator 12. This ensures a constant position for the clutch allowing the actuator to be switched off temporarily to save energy. Also this guarantees that the clutch will not slip when zero Slip Velocity is required. The aforementioned behaviour can be achieved by activating CF4 with no feedforward term.

When the release bearing is under automatic control, non-neutral gear is selected, the engine is running, zero Slip Velocity is required and no slip is detected and if the clutch includes an automatic wear adjuster, which ensures that the clutch load and travel characteristics remain substantially constant as the clutch plate wears, the control system may be arranged to periodically move the clutch release bearing to the fully engaged position for a short period in order to allow the automatic wear adjuster to operate. The aforementioned behaviour can be achieved by activating CF4 with the parameterisation appropriate to close the clutch quickly and keep it closed (generally, no feedforward term is required) until the Wear Adjuster Status changes its state to Wear Compensation Timeout or conditions for selecting Manual Control Function are satisfied or Slip Velocity is demand or driver selects neutral gear or attempts to switch the vehicle engine off.

Whenever the signal received from Sensor 27 indicates that a neutral gear had been selected by the driver the Gear Detections Status Observer enters the Neutral state. In this case the clutch is held open whatever the position of the clutch release bearing requested by the clutch engagement pedal 18. The aforementioned behaviour can be achieved by activating CF4 with the parameterisation appropriate to open the clutch quickly and keep it open until driver engages non-neutral gear or attempts to switch the vehicle engine off.

After the driver selects the non-neutral gear, the system Gear Detection Status Observer selects either
Gear Not Detected state if the absolute position of the gear lever cannot be measured due to unavailability of the appropriate hardware.
Appropriate gear (e.g. Gear 2) if the hardware that enables detection of the absolute gear lever position and hence the selected gear.

Thus, the selected gear can be taken directly from sensor 27 if it is capable to recognise the absolute position of the gear lever with sufficient accuracy to infer the selected gear algorithmically. Alternatively, the selected gear can be calculated by the system by calculating the mean gear ratio operative during the gear engagement and then selecting the closest gear ratio in the gearbox.

Additionally, the algorithm for gear detection from the drivetrain components' velocities should be capable of recognising the transient oscillations of the input shaft velocity in the gearbox immediately after the gear had been selected by the operator. These transient oscillations can be detected via the analysis of the filtered input shaft velocity measurement. The filter should be capable of filtering the engine combustion excited vibrations, but preserve the spectral characteristics of the transient vibrations of the input shaft during the gear engagement. The phase during which the oscillations of the input shaft velocity occur should be excluded from the calculation of the mean gear ratio to make the measurement more accurate. During the gear engagement the system may calculate the gear selected after selection but before or during clutch engagement. The ratio selected may be used to select the Slip Velocity demand map. The ratio selected may be used to select the transition point to the automatic mode and, potentially, to select the parameters within the control loop.

To move away from rest or to change gear the operator would normally depress the clutch pedal 18 and select the desired operative ratio with selector 17 and then re-engage the clutch using pedal 18. Should the operator omit to depress the clutch pedal 18 before moving the gear selector 17, the system can be arranged to disengage the clutch and subsequently re-engage the clutch in order to engage the selected ratio. This operation of the clutch by the control system during gear changes can be arranged to occur or all gear changes if required.

Transition from the manual control to the automatic control after non-neutral gear is selected while the engine is running is made before the clutch Slip Velocity becomes zero in order to not interrupt the damping of torsional vibrations in the associated drive line.

The system can also be arranged to inhibit the start-up/crank-on of the engine until the clutch pedal 18 is depressed or neutral gear mode is selected so that the clutch is opened sufficiently to prevent the transmission of a significant amount of engine torque.

The system should not be switched off until it is confirmed that the engine is not rotating. The clutch can be arranged to be in the closed or open position when the vehicle is switched off depending on the requirements of the vehicle manufacturer.

Further the control system can be arranged to control the clutch engagement sequence to replicate the sequence normally used by the operator if required.

An example of the operation of the proposed control system is presented in FIGS. 30 to 32 based on a simulation of a typical driving manoeuvre. In the presented manoeuver the driver goes through the following sequence of operations:

a. Driver opens the clutch and selects neutral
b. Driver switches the engine on
c. Driver lets the engine idle with the vehicle being stationary
d. Driver engages the gear (effect not shown in diagrams)
e. Driver starts closing the clutch allowing tie vehicle to start moving from rest
f. Driver finishes engaging the clutch and keeps accelerating the vehicle
g. Driver releases the throttle pedal and allows the vehicle to decelerate
h. Driver presses the throttle and accelerates again.

Referring to FIG. 30, portion D1 of the driver's pedal curve D shows the pedal demand signal to open the clutch. Portion D2 of the curve shows the pedal signal to maintaining the clutch open, portion D3 shows the pedal signal to engage the clutch and portion D4 shows the pedal released signal to maintain the clutch fully engaged.

The corresponding Demanded Release Bearing Position signal is shown by curve E with section E1 and E2 following curve section D1 and D2. During the lower part of Curve section E3 the demand position signal dips as demanded by the wear compensation control function. Subsequently the Demanded Release Bearing Position signal varies up and down depending on the throttle use and torsional vibrations occurring in the driveline. Curve F shows how the Under Predicted Position of the release bearing follows curve E FIG. 31 shows how the Demanded Slip Velocity curve G and measured Slip Velocity H change with time relative to each other.

FIG. 32 shows how the flywheel velocity J and the gearbox input shaft velocity K change in time during the manoeuvre. Section J1 shows the engine being switched on, section J2 shows the idle phase, section J3 shows acceleration of the vehicle, section J4 shows release of the throttle and section J5 shows further acceleration.

FIG. 33 shows the criteria states defining the active Vehicle Operation Modes at the manoeuvre points numbered 1 to 16 along the top of FIG. 30.

The invention claimed is:

1. A clutch control system for controlling a clutch which connects an engine with an associated vehicle driveline which includes a multi-ratio gearbox, the clutch control system having an actuator which can be operated by a vehicle driver to engage and disengage the clutch, the actuator also being operable by the clutch control system to move the clutch between fully engaged and fully released positions through a range of positions allowing variable levels of clutch slip in order to automatically reduce torsional vibrations in the driveline, the clutch control system being configured to recognize a plurality of predetermined Vehicle Operation Modes of the associated vehicle defined by the combination of a Clutch Slip Status criterion, wherein the Clutch Slip Status criterion is the current state of engagement of the clutch and selected from the group consisting of slipping, stick-slipping, stuck, closed and open, with one or more of the following criteria of an indication as to the current clutch position selected by the driver (Manual Clutch Position Control Input Interface Status), current position of a clutch release bearing (Release Bearing Position Status) and clutch slip velocity (Slip Velocity) demanded by the clutch control system (Slip Velocity Demand Status) and, dependent on which Vehicle Operation Mode is recognized, the clutch control system applies a different clutch control strategy to achieve a required level of clutch slip to damp vibration in the driveline of the associated vehicle and provide a transition between the different Vehicle Operation Modes.

2. The clutch control system according to claim 1, wherein the clutch control system is configured to recognize a Vehicle Operation Mode defined by a combination of the criteria of Clutch Slip Status, Slip Velocity Demand Status and Release Bearing Position Status.

3. The clutch control system according to claim 2, wherein the clutch control system is configured to recognize the Vehicle Operation Mode by determining if:
the clutch is slipping or stick-slipping, but zero Slip Velocity is required;
the clutch is slipping or stick-slipping and non-zero Slip Velocity is required;
the clutch release bearing position is between fully engaged and fully released positions at a position sufficient to transmit all engine torque without clutch slip and non-zero Slip Velocity is required, and
the clutch release bearing position is between fully engaged and fully released positions at a position sufficient to transmit all engine torque without clutch slip and zero Slip Velocity is required.

4. The clutch control system according to claim 1, wherein the control system operates by recognizing additional Vehicle Operation Modes which are defined by the inclusion of one or more of the additional operating criteria of engine operating state (Power Status of the Vehicle), whether an engine stop start function is operative (Stop-Start System Status), whether the associated vehicle is stationary or moving (Vehicle Velocity Status), which gear is currently selected in the associated gearbox (Gear Detection Status), whether the clutch release is being controlled by the driver or automatically by the clutch control system (Manual/Automatic Control Status) and whether, if an automatic clutch wear adjuster is fitted, it is time to close the clutch to allow adjustment (Wear Adjuster Status).

5. The clutch control system according to claim 1, wherein the clutch control system has a limited number of predetermined clutch control strategies available to apply in response to the plurality of Vehicle Operation Modes and varies these limited strategies by applying modifying parameters to these strategies, the modifying parameters being selected by the clutch control system dependent on the recognized Vehicle Operation Mode.

6. The clutch control system according to claim 1, wherein Clutch Slip Status is determined by an observer (Clutch Slip Status Observer) which determines whether the clutch is open, fully closed, not slipping, stick-slipping or slipping, the Clutch Slip Status Observer including hysteresis between maximum and minimum slip thresholds to stabilize the operation of the clutch control system due to the noise, delay and uncertainties in the measurement of the Slip Velocity, and the Clutch Slip Status Observer assumes that the clutch is always slipping or stick-slipping if a positive Slip Velocity is demanded by the clutch control system and a certain predefined Slip Velocity is reached until the clutch control system demands a zero Slip Velocity.

7. The clutch control system according to claim 1, wherein when zero clutch Slip Velocity is demanded the actuator moves the clutch release bearing to its fully closed position periodically to allow resetting of an automatic wear adjuster in the clutch.

8. The clutch control system according to claim 1, wherein the clutch control system is operative in a manual mode in which the position of a clutch engagement pedal dictates a commanded clutch release bearing position and an automatic mode in which a commanded clutch release bearing position is determined by the torsional vibrations in the associated drive line or other operating parameters of the associated vehicle, when the vehicle is operating in automatic mode, non-zero slip is demanded and no slip is detected the actuator moving the clutch release bearing to the position where the clutch starts slipping at a velocity dependent on the current position of the release bearing and the current distance of the clutch release bearing from the position where the clutch starts slipping.

9. The clutch control system according to claim 8, wherein when the clutch release bearing position is far from the position where the clutch starts slipping the actuator moves the clutch release bearing at a first speed, and as the current release bearing position approaches the position where the clutch starts slipping the speed of movement of the release bearing is reduced.

10. The clutch control system according to claim 8, wherein the clutch control system when in automatic mode, non-zero slip is demanded, no slip is detected and the clutch is positioned more engaged than an Under-Predicted Position, the actuator moves the clutch release bearing to the position where the clutch starts slipping using a control function that uses a feedforward term based on a Predicted Position or Predicted Effective Clutch Torque Capacity and a term which ensures that the torque which can be transmitted through the clutch decreases at a constant rate with reference to the Predicted Effective Clutch Torque Capacity.

11. The clutch control system according to claim 8, wherein the clutch control system when in automatic mode, zero slip is demanded, slip is detected and the clutch is positioned less engaged than an Under-Predicted Position, the actuator moves the clutch release bearing to the position where the clutch stops slipping using a control function that uses a feedforward term based on a Predicted Position or Predicted Effective Clutch Torque Capacity and a term which ensures that the torque which can be transmitted through the clutch increases at a constant rate with reference to the Predicted Effective Clutch Torque Capacity.

12. The clutch control system according to claim 1, wherein control logic of the clutch control system has two subsystems: a first subsystem determines the Slip Velocity Demand Status and a second subsystem which attempts to achieve the Slip Velocity Demand Status and ensures that the first subsystem performance targets are met by controlling the actuator.

13. The clutch control system according to claim 1, wherein the Slip Velocity Demand Status is calculated based on a pre-defined algorithm in the form of a multi-dimensional map having inputs chosen from throttle position, engine torque and driveline component velocity.

14. The clutch control system according to claim 1, wherein the Slip Velocity Demand Status is calculated based on a multi-dimensional map generated in dependence on the dynamic performance characteristics of the engine to improve the acceleration characteristics of the vehicle.

15. The clutch control system according to claim 1, wherein if non-zero clutch Slip Velocity is required and no slip is detected, the actuator will open the clutch until slip is detected;
wherein if non-zero clutch Slip Velocity is required and slip is detected, the position of the clutch release bearing is controlled using a closed loop control algorithm which aims to minimize the error between the Slip Velocity Demand Status and the actual measured Slip Velocity;
wherein if zero clutch Slip Velocity is required and slip is detected, the actuator will close the clutch until no slip is detected; and
wherein if zero Slip Velocity is required and no slip is detected, the actuator moves the clutch release bearing in order to fully engage the clutch.

16. The clutch control system according to claim 1, wherein the clutch position at which the clutch starts slipping is calculated based on an algorithm, one of the inputs to which is the level of torque passing through one of the driveline elements.

17. The clutch control system according to claim 1, wherein whenever the clutch control system detects that the driver has engaged neutral, the clutch is held open whatever the position of the clutch engagement pedal.

18. The clutch control system according to claim 1, wherein during gear engagement the clutch control system calculates which gear has been selected after selection but before clutch engagement and varies clutch engagement dependent on the gear selected.

19. The clutch control system according to claim 1, wherein during a gear change the clutch control system controls the clutch engagement to replicate an engagement sequence used by the driver or provides an alternative engagement sequence.

20. The clutch control system according to claim 1, wherein the transition between the different Vehicle Operation Modes is one without exciting a predetermined level of vibration in the driveline.

* * * * *